United States Patent [19]
Ando et al.

[11] Patent Number: 6,072,920
[45] Date of Patent: Jun. 6, 2000

[54] OPTICAL WAVEPLATE, METHOD OF MANUFACTURING THE SAME, AND WAVEGUIDE DEVICE USING THE SAME

[75] Inventors: Shinji Ando, Tokyo; Takashi Sawada, Saitama; Yasuyuki Inoue, Ibaragi, all of Japan

[73] Assignee: Nippon Telegraph and Telephone Corporation, Japan

[21] Appl. No.: 09/363,181

[22] Filed: Jul. 29, 1999

Related U.S. Application Data

[62] Division of application No. 09/111,549, Jul. 7, 1998, which is a division of application No. 08/840,139, Apr. 11, 1997, Pat. No. 5,901,259, which is a division of application No. 08/747,193, Nov. 12, 1996, Pat. No. 5,694,496, which is a continuation of application No. 08/645,920, May 14, 1996, abandoned, which is a continuation of application No. 08/237,109, May 3, 1994, abandoned.

[30] Foreign Application Priority Data

May 7, 1993 [JP] Japan ................................ 5-130127
Feb. 15, 1994 [JP] Japan ................................ 6-039368

[51] Int. Cl.[7] .................................................... G02B 6/00
[52] U.S. Cl. ............................................................. 385/11
[58] Field of Search ............................... 385/4, 11, 122, 385/129, 130, 131, 132, 141, 147

[56] References Cited

U.S. PATENT DOCUMENTS 5,121,238  6/1992  Osabe .
5,694,496  12/1997  Ando et al. ............................... 385/11

FOREIGN PATENT DOCUMENTS 0424951   5/1991   European Pat. Off. .
0454590   10/1991  European Pat. Off. .
4-175729  6/1992   Japan .
4-241304  8/1992   Japan .

OTHER PUBLICATIONS

Electronic Letters, vol. 29, No. 24, Nov. 25, 1993, Stevenage GB, pp. 2143–2144 "Thin Flexible Waveplate of Flourin-gated Polyimide".
Patent Abstracts of Japan, vol. 17, No. 100 (C–1030) Feb. 1993.
Database WPI, Section Ch, Week 9231, Derwent Publications Ltd., London, FB; Class A09, AN 92-256627.
Optics Letters, vol. 17, No. 7, Apr. 1, 1992, Washington US pp. 499–501, Takahashi et al. "Polarization–Insensitive Arrayed Waveguide Grating wavelength Multiplexer on Silicon".
Patent Abstracts of Japan, vol. 17, No. 10, (P–1466) Jan. 8, 1993.
Journal of Applied Polymer Science, vol. 41 (1990) pp. 2049–2058.
Shinji Ando et al., "Perfluorinated Polymide Synthesis" Macromolecules, vol. 25, No. 21, 1992, pp. 5858–5860.
T. Matsuura et al., "Polymide Derived from 2,2'–Bis (trifluoromethyl) 4,4'–diaminobiphenyl. 1. Synthesis and Characterization of Polyimides Prepared with . . . " vol. 24, No. 18, 1991, pp. 5001–5005.
T. Matsuura et al., "Polymides Derived from 2,2'–Bis (trifluoromethyl) 4,4'–diaminobiphenyl. 2. Synthesis and Characterization of Polyimides Prepared from . . . " vol. 25, No. 13, 1992, pp. 3540–3545.
T. Matsuura et al., "Heat resistant singlemode optical waveguides using fluorinated polymides" Electronics Letters, Nov. 25th, 1993, vol. 29, No. 24, pp. 2107–2109.
H. Takahashi et al., "Polarization insensitive arrayed waveguide grating wavelength multiplexer on silicon" Optics Letters vol. 17, No. 7, Apr. 1, 1992, pp. 499–501.
M. Kawachi, "Silica waveguides on silicon and their application to integrated optic components" Optical and Quantum Electronics 22 (1990) pp. 391–416.
K. Nakagawa "Optical Anisoptropy of Polymide" Journal of Applied Polymer Science, vol. 41, 1990 pp. 2049–2058.

*Primary Examiner*—Akm E. Ullah
*Attorney, Agent, or Firm*—Blakely Sokoloff Taylor & Zafman

[57] ABSTRACT

An optical waveplate includes a polyimide with a film thickness of 20 μm or less.

26 Claims, 14 Drawing Sheets

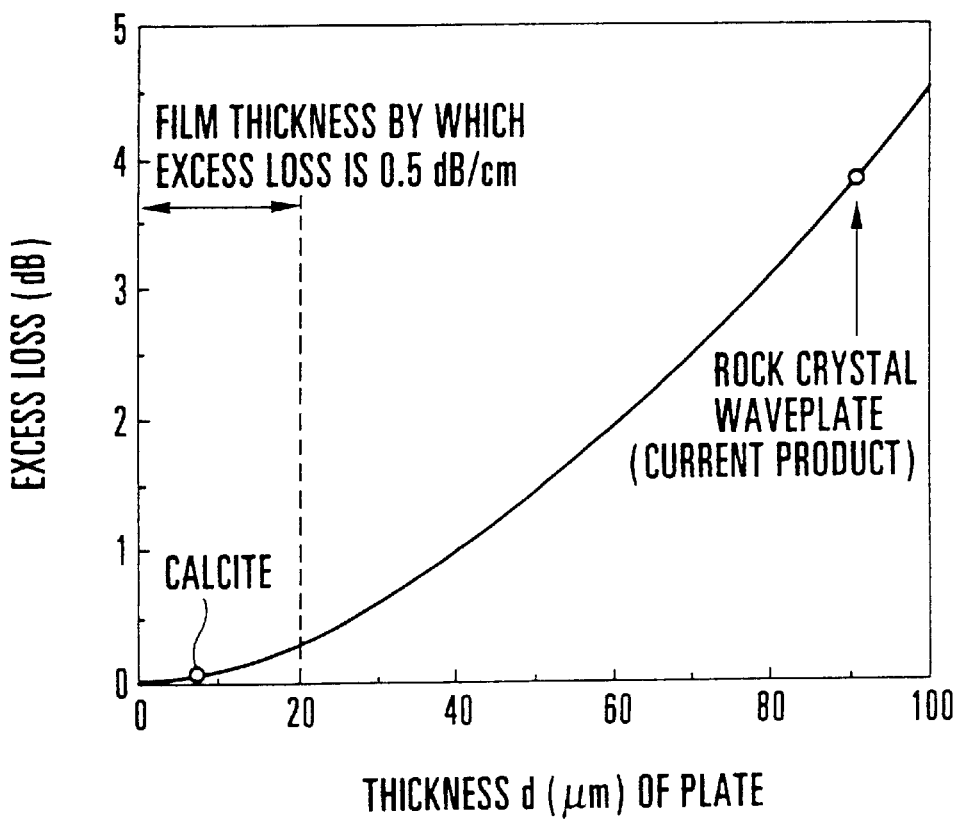
F I G. 1

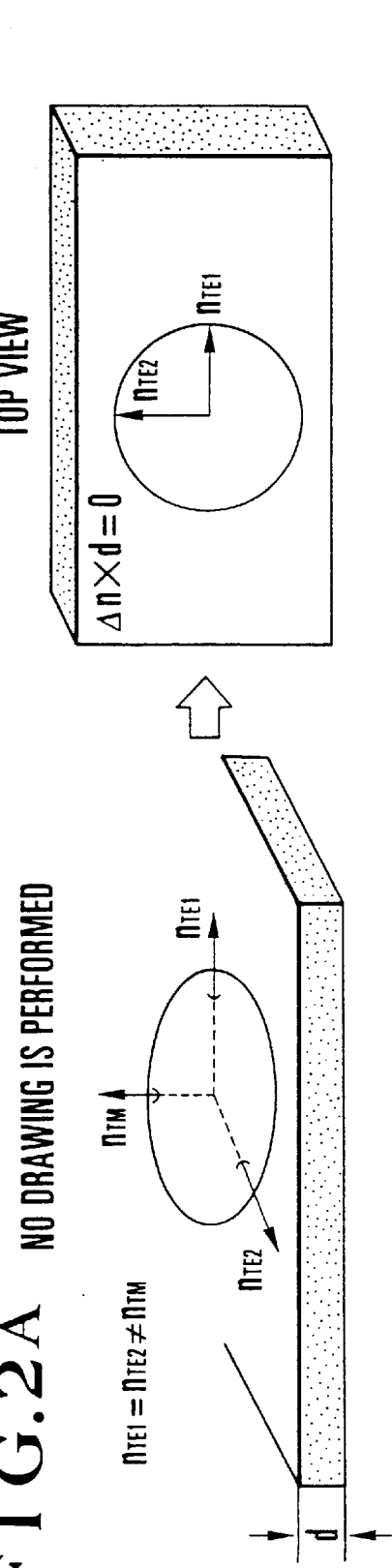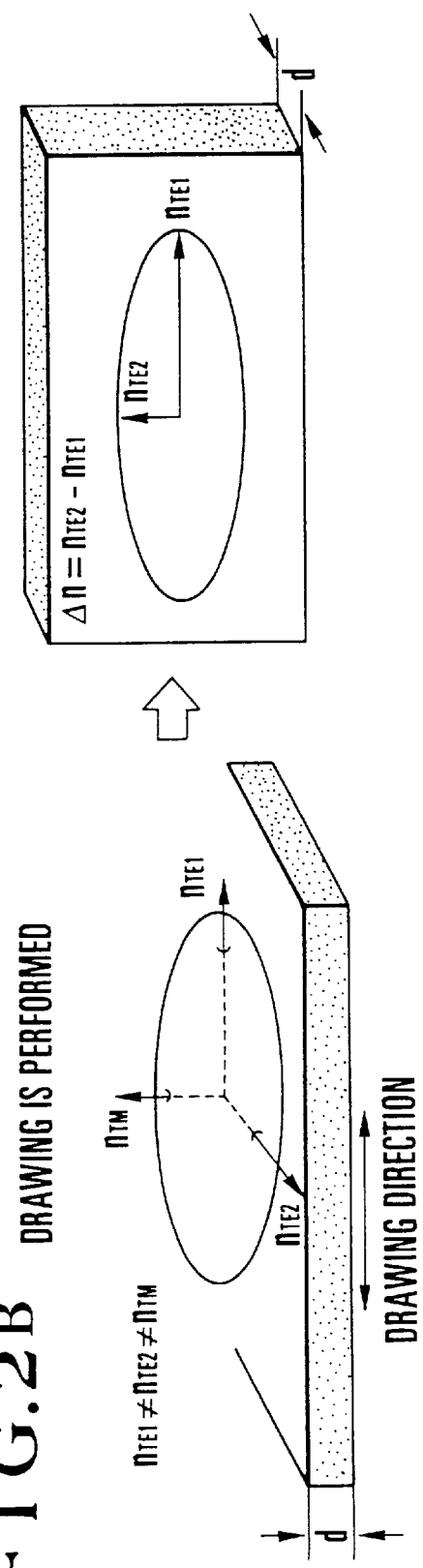
FIG. 2A  NO DRAWING IS PERFORMED
FIG. 2B  DRAWING IS PERFORMED

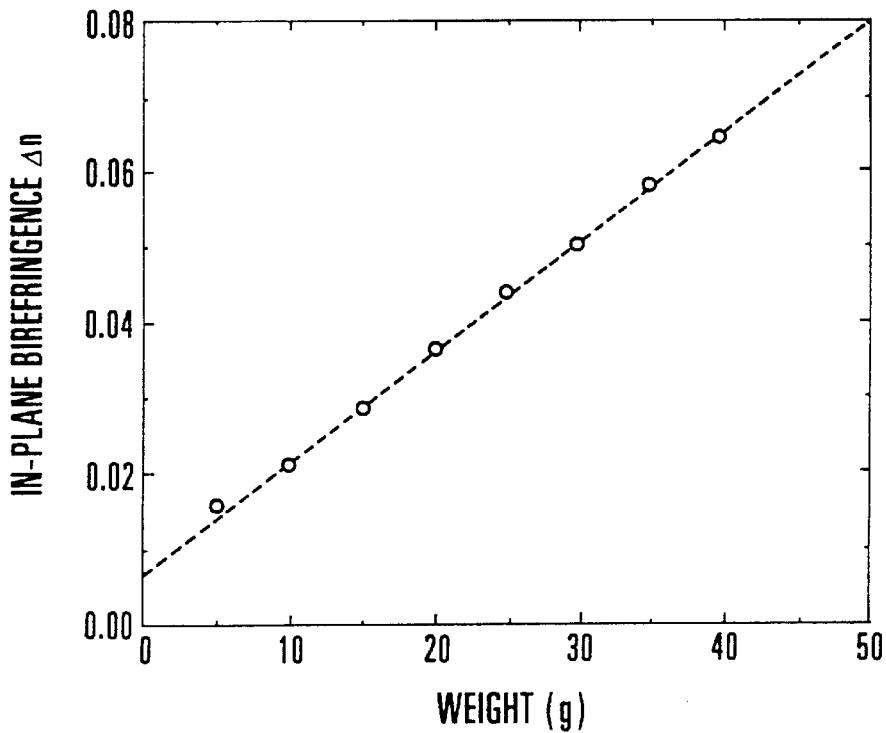
F I G. 3
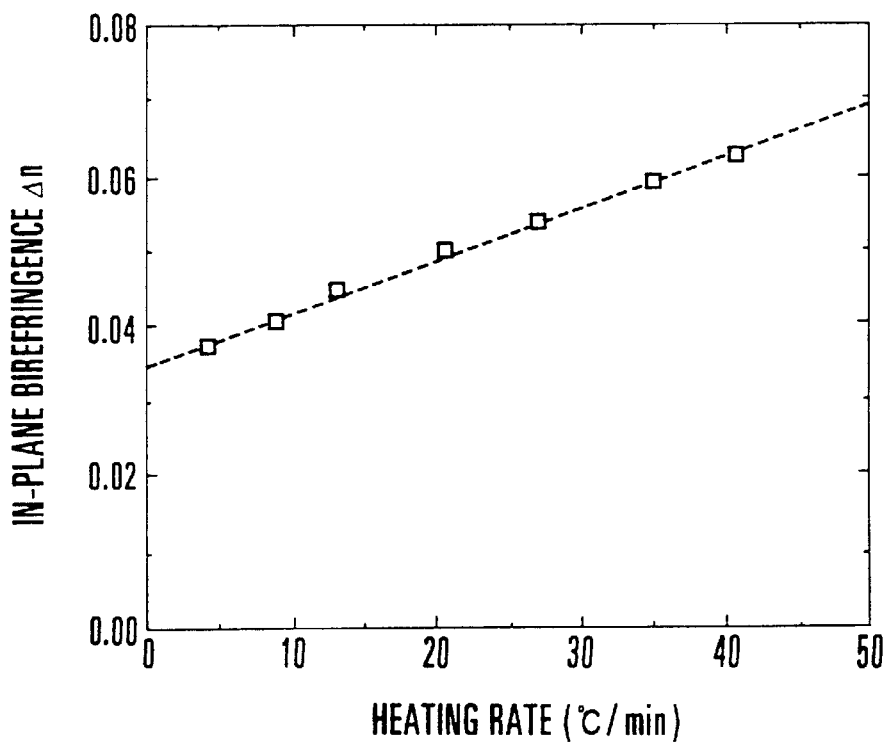
F I G. 4

OPTICAL WAVEPLATE, METHOD OF MANUFACTURING THE SAME, AND WAVEGUIDE DEVICE USING THE SAME

This is a divisional of Ser. No. 09/111,549, filed Jul. 7, 1998 which is a divisional of Ser. No. 08/840,139 filed Apr. 11, 1997, now U.S. Pat. No. 5,901,259 which is a divisional of Ser. No. 08/747,193 filed Nov. 12, 1996, now U.S. Pat. No. 5,694,496 which is a continuation of Ser. No. 08/645,920 filed May 14, 1996, now abandoned which is a continuation of Ser. No. 08/237,109 filed May 3, 1994, now abandoned.

BACKGROUND OF THE INVENTION

The present invention relates to an optical waveplate for use in an optical communication system, a method of manufacturing the optical waveplate, and a waveguide device using the optical waveplate.

Recently, various methods have been proposed for transmission of a large quantity of information stably and inexpensively. An optical communication system is one of these methods. A representative example of this optical communication system is a method (wavelength division multiplexing system) in which light components having a plurality of wavelengths and carrying their respective signals are multiplexed into single light by a multiplexer and transmitted to a remote place through an optical fiber. The light is demultiplexed into the light components with their original wavelengths by a demultiplexer upon reception, thereby detecting the individual signals. This method can increase the communication capacity in proportion to the multiplexing number of wavelengths and is therefore a very effective method of increasing the capacity. This method also can reduce the load on hardware in an optical communication network connecting a number of points and makes a more advanced network arrangement possible by using a combination of a plurality of light wavelengths, multiplexers, and demultiplexers in addition to spatial wiring.

A system of the above sort requires a light source which oscillates at a plurality of wavelengths, and a multi/demultiplexer for multiplexing/demultiplexing light. As the multi/demultiplexer, a device using PLCs (Planar Lightwave Circuits) consisting of optical waveguides formed on a substrate has been developed as the most realistic device from the point of view of a small size, a light weight, and a high reliability. Of these PLCs, a silica-based PLC fabricated by depositing a silica glass film on a silicon substrate is expected as a practical optical component, since it has a small optical loss and consequently a high stability against disturbance such as heat or vibrations.

The most serious problem in putting the silica-based PLC into practical use is its polarization dependence. That is, as mentioned above, this silica-based PLC is manufactured by depositing a glass film on a silicon substrate. Therefore, the difference in thermal expansion coefficient between the glass film and the silicon substrate makes a stress applied on an optical waveguide in a direction parallel to the surface of the substrate differ from that in a direction perpendicular to the substrate surface. Consequently, the refractive index of the optical waveguide in the direction parallel to the surface of the silicon substrate becomes different from that in the direction perpendicular to the substrate surface. This is termed "waveguide birefringence". When, for example, an asymmetrical Mach-Zender interferometer is constituted by the silica-based PLC, this waveguide birefringence gives rise to a problem that the optical path length difference (a difference in refractive index x physical length) of an arm constituting the interferometer changes depending on the polarizing direction of light. Consequently, the device characteristics change in accordance with the polarized state of light. This makes it impossible to apply the device to a system using a single-mode fiber.

This problem of the polarization dependence of the PLC caused by the waveguide birefringence is not inherent in a silica-based glass waveguide. That is, all waveguides currently manufactured have this problem because they also have waveguide birefringence, although the degrees of waveguide birefringence differ from one another. Examples of the waveguides are a titanium in-diffused $LiNbO_3$ waveguide, a proton-exchanged $LiNbO_3$ waveguide, an ion-exchanged glass waveguide, a semiconductor waveguide, a polycarbonate waveguide, a polyimide waveguide, a silicone resin waveguide, and an epoxy resin waveguide.

As a method for compensating for the birefringence of a silica-based optical waveguide, a method of mounting amorphous silicon on top of a waveguide and using the resultant stress is known. This method, however, requires some additional steps, such as a step of mounting amorphous silicon and a step of trimming the amorphous silicon by using a laser, after a sample is formed, in order to finely adjust the stress. In addition, since it is difficult to compensate for the waveguide birefringence across a wide area, individual waveguides must be spaced apart from one another. It is, therefore, impossible to apply this method to waveguides integrated at a high density. As described above, the method using the stress of amorphous silicon has several practical problems.

Takahashi et al., on the other hand, have developed a method of eliminating the polarization dependence of the PLC by inserting a half waveplate consisting of a rock crystal at the center of an optical circuit of an arrayed-waveguide grating-type wavelength multi/demultiplexer such that the optical principal axis of the half waveplate forms an angle of 45° with a substrate. (Hiroshi Takahashi et al., "Optics Letters," Vol. 17, No. 7, pp. 499–501 (1992)). Takahashi et al. have also pointed out in Japanese Patent Prepublication No. 4-241304 that this method is also effective in eliminating the polarization dependence of a Mach-Zender interferometer, a ring resonator, a directional coupler, and a phase modulator. This method of eliminating the polarization dependence of an optical circuit by inserting a rock-crystal half waveplate at the center of the optical circuit realizes a high reliability for long periods of time, has simple manufacturing steps, and can be applied to all waveguides in addition to a silica-based glass waveguide. Therefore, the method is very effective compared to the above-mentioned method by which amorphous silicon is mounted.

A rock crystal has a high heat resistance, a high humidity resistance, and a high precision processability and shows stable optical characteristics. Therefore, a PLC incorporating a rock-crystal half waveplate has a high reliability. However, this method has a large drawback; that is, since there is no light-confining structure in the half waveplate and in a groove for receiving the half waveplate, light propagating through the waveguide is radiated from these portions, resulting in loss of light. According to the report by Takahashi et al., an excess loss of 5 dB is produced when a half waveplate consisting of a rock crystal is inserted into a 100-$\mu$m wide groove formed in a waveguide with a specific refractive index difference of 0.75%. This value is extremely large compared to a loss of 2 to 3 dB of the PLC itself. Consequently, it has been impossible to apply the method to actual PLCs from the point of view of the optical loss.

To obtain a PLC incorporating an optical waveplate as a highly practical component, it is important to decrease the excess loss produced by insertion of the waveplate to 0.5 dB or less (i.e., to reduce the decrease in the light quantity to 10% or less).

FIG. 1 shows the result of simulation of the excess loss performed by assuming that a light beam emitted from the end face of an optical waveguide is a Gaussian beam. This characteristic curve illustrated in FIG. 1 shows that the excess loss is reduced to 0.3 dB or less when the film thickness of an optical waveplate is 20 $\mu$m or less.

In a practical case, however, a loss of about 0.1 to 0.2 dB is unavoidable because of Fresnel reflection or scattering at the end face of a waveplate. When this fact is taken into consideration, therefore, the film thickness of an optical waveplate must be 20 $\mu$m or smaller in order to reduce the excess loss as a result of insertion of a waveplate to 0.5 dB or less. To manufacture a half waveplate, with a wavelength (1.3 $\mu$m, 1.55 $\mu$m) currently used in long-distance optical communication, to have a film thickness of 20 $\mu$m or smaller, the material of the waveplate is required to have an in-plane birefringence greater than at least 0.03. A rock-crystal half waveplate brings about a large excess loss as described above because its thickness is as large as 91 $\mu$m. This large thickness results from a small birefringence of a rock crystal of 0.0085 at a wavelength of 1.3 $\mu$m. The use of a material having a large birefringence makes it possible to manufacture a thin waveplate, and this results in a decreased excess loss. Calcite and titanium oxide are known as inorganic single-crystal materials, other than a rock crystal, having a large birefringence; both calcite and titanium oxide have a birefringence larger than that of a rock crystal. However, the rough of calcite is expensive, and the thickness of a half waveplate consisting of calcite becomes as very small as 4 $\mu$m because the birefringence of calcite is large, 0.16, at a wavelength of 1.3 $\mu$m. Since the hardness of calcite is low (Mohs hardness: 2), it is very difficult to process calcite to have this small thickness. Even if calcite can be thus processed, the product must be handled with enough care. On the other hand, the refractive index of titanium oxide is 2.62 to 2.90, which is largely different from those of silica and other optical waveguide materials. Therefore, when a waveplate consisting of titanium oxide is inserted into an optical waveguide, a loss caused by Fresnel reflection at the end face of the waveguide is large. Consequently, the effect of decreasing the thickness of a waveplate becomes insignificant. For the reasons discussed above, neither calcite nor titanium oxide is a suitable material to be inserted into a lightwave circuit.

In order that a waveguide device in which a half waveplate is inserted be used in practice, the heat resistance and the humidity resistance of the waveplate and the ease in handling the waveplate are also important factors. For example, a waveguide device fabricated on a single substrate is used not only as a single component by itself but also as an "optical and electronic hybrid interconnection" in combination with other lightwave circuits and electric circuits fabricated on the same substrate. The fabrication of these photonic components involves a soldering step performed at about 260° C. and a step performed at a temperature which temporarily exceeds 300° C. Therefore, all the materials used in the fabrication are required to have a heat resistance of about 350° C.

An amorphous polymer plastic material is known as a material which produces a birefringence. Representative examples of such a polymer material are polycarbonate and polyvinyl alcohol. These materials produce an in-plane birefringence when films consisting of the materials are drawn. In practice, large retardation plates for use in liquid-crystal displays are manufactured by using these polymer materials. Retardation plates consisting of polystyrene, a cellulose derivative, polyvinyl chloride, polypropylene, an acrylic polymer, poly(amic acid), polyester, and an ethylene-vinyl acetate copolymer saponified material are also known. However, the polyvinyl alcohol-based material and the cellulose derivative-based material have a low humidity resistance, and the polypropylene-based material is unsatisfactory in toughness. The acryl-based material is difficult to draw because its mechanical strength in the form of a film is low. The polycarbonate-based material is poor in chemical resistance.

The polyvinyl chloride material and the polystyrene-based material are unsatisfactory particularly in heat resistance and are therefore inadequate for the purpose of the present invention. Although the poly(amic acid)-based material and the polyester-based material are considered to have a relatively high heat resistance, none of these materials has a heat resistance of 300° C. or higher which is required for waveguide devices. Also, a waveplate made from any of these organic polymer materials is reduced in birefringence due to activation of molecular motion even at a temperature lower than its softening point (glass transition temperature). This largely degrades the characteristics as a waveplate. In addition, not a few of these organic polymer materials have a saturation water absorption of 2 to 3%. Since, however, water molecules strongly absorb light with optical communication wavelengths to increase the loss, the material to be used as a waveplate must have as low a water absorption as possible.

As discussed above, it is difficult to manufacture waveplates that can be incorporated in optical waveguides by using any of the conventionally known polymer materials.

In summary, the problems of the conventional optical waveplate techniques are as follows. That is, for waveplates using inorganic single-crystal materials, no material having an appropriate birefringence and refractive index by which a waveplate can be incorporated in a waveguide device is available. In addition, these materials are difficult to process and expensive. On the other hand, waveplates consisting of plastic materials have problems in the heat resistance, humidity resistance, and mechanical strength of a material, and in the stability of in-plane birefringence.

SUMMARY OF THE INVENTION

It is, therefore, a principal object of the present invention to provide an optical waveplate which can be readily manufactured and processed, has high heat resistance, humidity resistance, flexibility, and mechanical strength, and also has a small film thickness, a method of manufacturing this optical waveplate, and a waveguide device using the waveplate.

It is another object of the present invention to provide a waveguide device having a sufficient optical transparency.

To achieve the above objects, the present inventors have focused attention on a polyimide optical material which is applicable to optical waveguides, in view of the fact that the existing plastic optical materials are unsatisfactory in heat resistance and humidity resistance.

As for this polyimide optical material, "Macromolecules" [T. Matsuura et al., Vol. 24, pp. 5,001–5,005, 1991 and T. Matsuura et al., Vol. 25, pp. 3,540–3,545, 1992] have already reported that polyimide films having a heat resistance of 300° C. or higher, a low water absorption of 0.7% or lower, and a high optical transparency can be obtained by synthesizing various fluorinated polyimides by using 2,2'-bis(trifluoromethyl)-4,4'-diaminobiphenyl as a diamine component. T. Matsuura et al. have also reported in Elec. Lett. Vol. 29, No. 24, pp. 2,107–2,109 that good optical waveguides for near-infrared light can be formed by using, as a core and a cladding, a polyimide synthesized by using a diamine and two different types of tetracarboxylic dianhydrides. In addition, in "Macromolecules" [T. Matsuura et al., Vol. 25, pp. 5,858–5,860, 1992], S. Ando et al. have reported a perfluorinated polyimide having no light absorption peak in the entire optical communication wavelength region (wavelength 1.0 to 1.7 $\mu$m) and having a heat resistance and a low water absorption equivalent to those of fluorinated polyimides. This makes it possible to provide a plastic optical material with a very small loss even in a wavelength band in which heat-resistant plastic materials are conventionally difficult to use because they have absorption peaks inherent in their molecular structures. It is also found that polyimides can be readily processed and handled because of their high flexibility and are superior to other organic polymer materials in toughness.

The gist of the present invention is to apply these characteristic features of the polyimide optical material to optical waveplates.

The basic concept of the present invention is to form an optical waveplate by using a polyimide having a film thickness of 20 $\mu$m or smaller. An optical waveplate with this arrangement is formed by thermally imidizing a poly(amic acid) solution, which is synthesized from a tetracarboxylic acid or its derivative and a diamine, to have a film thickness of 20 $\mu$m or less. In this case, the formed film is subjected to uniaxial drawing or equivalent strain processing.

Although details of examples of this strain processing will be discussed later as the examples of the present invention, the processing will be briefly explained below. That is, a poly(amic acid) solution synthesized from a tetracarboxylic acid or its derivative and a diamine is coated on a substrate and dried for a short time period. Thereafter, the resultant film is peeled from the substrate with the solvent contained in the film, and uniaxially drawn. The film is then fixed to a metal frame or the like and thermally imidized. In another example, a poly(amic acid) film is thermally imidized while it is uniaxially drawn. In still another example, a poly(amic acid) film is thermally imidized while it is fixed only in a uniaxial drawing direction by a metal frame or the like. In still another example, a poly(amic acid) solution is coated on a substrate having an anisotropy of thermal expansion coefficient in its plane, and the resultant material is thermally imidized. In still another example, a polyimide film is uniaxially drawn at a high temperature of 300° C. or higher. In still another example, a polyimide film is thermally treated at a temperature of 300° C. or higher.

A waveguide device is constituted by using an optical waveguide formed on a substrate and the polyimide waveplate characterized by the present invention. As an example, a waveguide device is constituted by inserting the optical waveplate of the present invention into an optical waveguide such that the waveplate is either perpendicular to or inclined from the longitudinal direction of the waveguide. Alternatively, a half waveplate according to the present invention is inserted into a waveguide such that the optical principal axis of the half waveplate makes an angle of 45° with a waveguide substrate.

Still another waveguide device characterized by the present invention comprises an optical waveguide formed on a substrate and a polarization convertor consisting of a polyimide optical waveplate arranged in the middle of the optical path of the waveguide. This polarization convertor consisting of the polyimide optical waveplate converts horizontal polarization (TE mode: light having an electric field component in a plane parallel to a substrate) contained in guided light into vertical polarization (TM mode light having an electric field component in a plane perpendicular to a substrate) and vice versa. With this arrangement, the dependence of the waveguide device on polarization can be eliminated. Eliminating the polarization dependence by replacing the horizontal polarization with the vertical polarization and vice versa by inserting a half waveplate in the middle of the optical path is identical in principle with the method disclosed in Japanese Patent Prepublication No. 4-241304 mentioned earlier. The characteristic feature of the present invention, however, is that an excess loss caused by insertion of a waveplate is largely decreased by applying a polyimide optical waveplate with a film thickness of 20 $\mu$m or less to a waveguide device.

Still another waveguide device characterized by the present invention comprises an optical waveguide formed on a substrate and a polyimide optical waveplate. This waveplate inserted into the waveguide consists of a novel polarization beam splitter as a quarter waveplate. This polarization beam splitter is so inserted that its optical principal axis is either perpendicular or parallel to the waveguide substrate. Although the principle of operation of this invention will be described in detail later by way of its examples, this quarter waveplate is not used as a polarization convertor but used to cause the horizontal polarization of guided light to have an optical path length longer or shorter by a quarter wavelength than that for the vertical polarization.

Still another waveguide device characterized by the present invention comprises magnetic and nonmagnetic waveguides formed on a substrate and a polyimide optical waveplate. This waveplate inserted into the waveguide consists of a novel circulator as a half waveplate. This circulator is so inserted that its optical principal axis forms an angle of 22.5° or 67.5° with the waveguide substrate. Although details of the operating principle of this invention will also be described later by way of the examples, this half waveplate is used to rotate the polarizing direction of guided light through 45° or 135°.

Still another waveguide device characterized by the present invention comprises an optical waveguide formed on a substrate and a polyimide optical waveplate. This waveplate is in tight contact with the end face of the waveguide so as to be perpendicular to or inclined from the longitudinal direction of the waveguide. In addition, a reflecting coat is formed on the side of the waveplate not in contact with the end face of the waveguide. This allows a single device to achieve both the effect obtained by the waveplate and the reflection of light. This waveplate can be a quarter waveplate. In this case, the optical principal axis of this quarter waveplate is so arranged as to make an angle of 45° with the waveguide substrate. Although the operating principle of this invention will also be described in detail later by way of the examples, the quarter waveplate and the reflecting coat formed on it are used for the purposes of reflecting guided light and rotating the polarizing direction of the light through 90°.

In still another waveguide device characterized by the present invention, a plurality of several different types of waveguide devices as described above are formed on the same substrate and coupled to each other through optical waveguides.

Note that a method of obtaining a birefringence in the plane of a polyimide film is described in K. Nakagawa, "J. Appl. Polymer Sci.," Vol. 41, pp. 2,049–2,058, 1990. In this method, a film consisting of a poly(amic acid) synthesized from a pyromellitic dianhydride and 4,4'-diaminodiphenylether is thermally imidized up to 160° C. under a tensile stress and then thermally treated up to 350° C. By this method, drawing of a maximum of 83% is possible, and a polyimide film having a large in-plane birefringence of approximately 0.18 (wavelength 0.633 μm) can be obtained when drawing of 30% or more is done. However, this literature does not mention a method of controlling the birefringence and the film thickness required to apply polyimides to waveplates.

The present inventors, therefore, have performed uniaxial drawing for films consisting of poly(amic acid)s and polyimides, which are synthesized by combining various acid anhydrides as derivatives of tetracarboxylic acids with various diamines, by using several different methods. Consequently, it is found that the anisotropy of a refractive index (birefringence) appears in the plane of a film in each and every case. Thereafter, the present inventors have made extensive studies on a method of controlling the in-plane birefringence and the film thickness after thermal imidization, and completed the optical waveplates according to the present invention and the method of manufacturing the waveplates.

Consequently, the present inventors have completed the waveguide devices according to the present invention by incorporating the various optical waveplates obtained by the above method in waveguide devices each comprising one or more optical waveguides with birefringence formed on a substrate.

FIGS. 2A and 2B are views each for explaining the effect of drawing for a refractive index ellipsoid representing the refractive index anisotropy of polyimide films. FIG. 2A illustrates the refractive index ellipsoid of a polyimide film not subjected to the drawing, and FIG. 2B illustrates the refractive index ellipsoid of a polyimide film subjected to the drawing. When no drawing is performed, a refractive index anisotropy (birefringence) is found in a direction perpendicular to the plane of the film, but no refractive index anisotropy is found in the direction of the plane ($n_{TE1}=n_{TE2}$). After the drawing is performed, however, the birefringence is found not only in the direction perpendicular to the plane but also in the direction of the plane ($n_{TE1}=n_{TE2}$), since the molecular chains orient in the drawing direction. In the present invention, of $n_{TE1}$ and $n_{TE2}$ perpendicular to each other, $n_{TE1}$ which has a larger refractive index and the same direction as the drawing direction is defined as the optical principal axis. This axis is sometimes also called a slow axis. If a value (retardation) calculated by multiplying the in-plane birefringence ($\Delta n: n_{TE1}-n_{TE2}$) by the film thickness (d) is in agreement with a half or quarter of the wavelength of a light beam, the film can be used as a half or quarter waveplate. The film can also be used as a waveplate of a higher order by controlling the in-plane birefringence and the film thickness.

Examples of the tetracarboxylic acid, and an acid anhydride, an acid chloride, and an ester as derivatives of the tetracarboxylic acid for use in the present invention are as follows. The names enumerated below are names as tetracarboxylic acids. Examples are:
pyromellitic acid,
trifluoromethylpyromellitic acid,
pentafluoroethylpyromellitic acid,
bis{3,5-di(trifluoromethyl)phenoxy}pyromellitic acid,
2,3,3',4'-biphenyltetracarboxylic acid,
3,3',4,4'-tetracarboxydiphenylether,
2,3',3,4'-tetracarboxydiphenylether,
3,3',4,4'-benzophenonetetracarboxylic acid,
2,3,6,7-tetracarboxynaphthalene,
1,4,5,7-tetracarboxynaphthalene,
1,4,5,6-tetracarboxynaphthalene,
3,3',4,4'-tetracarboxydiphenylmethane,
3,3',4,4'-tetracarboxydiphenylsulfone,
2,2-bis(3,4-dicarboxyphenyl)propane,
2,2-bis(3,4-dicarboxyphenyl)hexafluoropropane,
5,5'-bis(trifluoromethyl)-3,3',4,4'-tetracarboxybiphenyl,
2,2',5,5'-tetrakis(trifluoromethyl)-3,3',4,4'-tetracarboxybiphenyl,
5,5'-bis(trifluoromethyl)-3,3',4,4'-tetracarboxydiphenylether,
5,5'-bis(trifluoromethyl)-3,3',4,4'-tetracarboxybenzophenone,
bis{trifluoromethyl)dicarboxyphenoxy}benzene,
bis{(trifluoromethyl)dicarboxyphenoxy}(trifluoromethyl)benzene,
bis(dicarboxyphenoxy)(trifluoromethyl)benzene,
bis(dicarboxyphenoxy)bis(trifluoromethyl)benzene,
bis(dicarboxyphenoxy)tetrakis(trifluoromethyl)benzene,
3,4,9,10-tetracarboxyperylene,
2,2-bis{4-(3,4-dicarboxyphenoxy)phenyl}propane,
butanetetracarboxylic acid,
cyclopentanetetracarboxylic acid,
2,2-bis{4-(3,4-dicarboxyphenoxy)phenyl}hexafluoropropane,
bis{(trifluoromethyl)dicarboxyphenoxy}biphenyl,
bis{(trifluoromethyl)dicarboxyphenoxy}bis(trifluoromethyl)biphenyl,
bis{(trifluoromethyl)dicarboxyphenoxy}diphenylether,
bis(dicarboxyphenoxy)bis(trifluoromethyl)biphenyl,
bis(3,4-dicarboxyphenyl)dimethylsilane,
1,3-bis (3,4-dicarboxyphenyl)tetramethyldisiloxane,
1,4-bis(3,4-dicarboxytrifluorophenoxy)tetrafluorobenzene,
1,4-bis(3,4-dicarboxytrifluorophenoxy)octafluorobiphenyl,
1,4-difluoropyromellitic acid,
1-trifluoromethyl-4-fluoropyromellitic acid,
1,4-di(trifluoromethyl)pyromellitic acid,
1-pentafluoroethyl-4-fluoropyromellitic acid,
1-pentafluoroethyl-4-trifluoromethylpyromellitic acid,
1,4-di(pentafluoroethyl)pyromellitic acid,
1-pentafluorophenyl-4-fluoropyromellitic acid,
1-pentafluorophenyl-4-trifluoromethylpyromellitic acid,
1-pentafluorophenyl-4-pentafluoroethylpyromellitic acid,
1,4-di(pentafluorophenyl)pyromellitic acid,
1-trifluoromethoxy-4-fluoropyromellitic acid,
1-trifluoromethoxy-4-trifluoromethylpyromellitic acid,
1-trifluoromethoxy-4-pentafluoroethylpyromellitic acid,
1-trifluoromethoxy-4-pentafluorophenylpyromellitic acid,
1,4-di(trifluoromethoxy)pyromellitic acid,
1-pentafluoroethoxy-4-fluoropyromellitic acid,
1-pentafluoroethoxy-4-trifluoromethylpyromellitic acid,
1-pentafluoroethoxy-4-pentafluoroethylpyromellitic acid,
1-pentafluoroethoxy-4-pentafluorophenylpyromellitic acid,
1-pentafluoroethoxy-4-trifluoromethoxypyromellitic acid,
1,4-di(pentafluoroethoxy)pyromellitic acid,
1-pentafluorophenoxy-4-fluoropyromellitic acid,
1-pentafluorophenoxy-4-trifluoromethylpyromellitic acid,
1-pentafluorophenoxy-4-pentafluoroethylpyromellitic acid,
1-pentafluorophenoxy-4-pentafluorophenylpyromellitic acid,
1-pentafluorophenoxy-4-trifluoromethoxypyromellitic acid,
1-pentafluorophenoxy-4-pentafluoroethoxypyromellitic acid, 1,4-di(pentafluorophenoxy)pyromellitic acid,
hexafluoro-3,3',4,4'-biphenyltetracarboxylic acid,
hexafluoro-3,3',4,4'-biphenylethertetracarboxylic acid,
hexafluoro-3,3',4,4'-benzophenonetetracarboxylic acid,
bis(3,4-dicarboxytrifluorophenyl)sulfone,
bis(3,4-dicarboxytrifluorophenyl)sulfide,
bis(3,4-dicarboxytrifluorophenyl)difluoromethane,
1,2-bis(3,4-dicarboxytrifluorophenyl)tetrafluoroethane,
2,2-bis(3,4-dicarboxytrifluorophenyl)hexafluoropropane,
1,4-bis(3,4-dicarboxytrifluorophenyl)tetrafluorobenzene,
3,4-dicarboxyfluorophenyl-3',4'-dicarboxytrifluorophenoxy-difluoromethane,
bis(3,4-dicarboxytrifluorophenoxy)difluoromethane,
1,2-bis(3,4-dicarboxytrifluorophenoxy)tetrafluoroethane,
2,2-bis(3,4-dicarboxytrifluorophenoxy)hexafluoropropane,
1,4-bis(3,4-dicarboxytrifluorophenoxy)tetrafluorobenzene,
2,3,6,7-tetracarboxy-tetrafluoronaphthalene,
2,3,6,7-tetracarboxy-hexafluoroanthracene,
2,3,6,7-tetracarboxy-hexafluorophenanthrene,
2,3,6,7-tetracarboxy-tetrafluorobiphenylene,
2,3,7,8-tetracarboxy-tetrafluorodibenzofuran,
2,3,6,7-tetracarboxy-tetrafluoroanthraquinone,
2,3,6,7-tetracarboxy-pentafluoroanthrone,
2,3,7,8-tetracarboxy-tetrafluorophenoxathiin,
2,3,7,8-tetracarboxy-tetrafluorothianthrene, and
2,3,7,8-tetracarboxy-tetrafluorodibenzo[b,e]1,4dioxane.

Examples of the diamine for use in the present invention are:
m-phenylenediamine,
2,4-diaminotoluene,
2,4-diaminoxylene,
2,4-diaminodurene, 4-(1H,1H,11H-eicosafluoroundecanoxy)-1,3-diaminobenzene,
4-(1H,1H-perfluoro-1-butanoxy)-1,3-diaminobenzene,
4-(1H,1H-perfluoro-1-heptanoxy)-1,3-diaminobenzene,
4-(1H,1H-perfluoro-1-octanoxy)-1,3-diaminobenzene,
4-pentafluorophenoxy-1,3-diaminobenzene,
4-(2,3,5,6-tetrafluorophenoxy)-1,3-diaminobenzene,
4-(4-fluorophenoxy)-1,3-diaminobenzene,
4-(1H,1H,2H,2H-perfluoro-1-dodecanoxy)-1,3-diaminobenzene,
p-phenylenediamine,
2,5-diaminotoluene,
2,3,5, 6-tetramethyl-p-phenylenediamine,
2,5-diaminobenzotrifluoride,
bis(trifluoromethyl)phenylenediamine,
diaminotetra(trifluoromethyl)benzene,
diamino(pentafluoroethyl)benzene,
2,5-diamino(perfluorohexyl)benzene,
2,5-diamino(perfluorobutyl)benzene,
benzidine,
2,2'-dimethylbenzidine,
3,3'-dimethylbenzidine,
3,3'-dimethoxybenzidine,
2,2'-dimethoxybenzidine,
3,3',5,5'-tetramethylbenzidine,
3,3'-diacetylbenzidine,
2,2'-bis(trifluoromethyl)-4,4'-diaminobiphenyl,
3,3'-bis(trifluoromethyl)-4,4'-diaminobiphenyl,
4,4'-diaminodiphenylether,
4,4'-diaminodiphenylmethane,
4,4'-diaminodiphenylsulfone,
2,2'-bis(p-aminophenyl)propane,
3,3'-dimethyl-4,4'-diaminodiphenylether,
3,3'-dimethyl-4,4'-diaminodiphenylmethane,
1,2-bis(anilino)ethane,
2,2-bis(p-aminophenyl)hexafluoropropane,
1,3-bis(anilino)hexafluoropropane,
1,4-bis(anilino)octafluorobutane,
1,5-bis(anilino)decafluoropentane,
1,7-bis(anilino)tetradecafluoroheptane,
2,2'-bis(trifluoromethyl)-4,4'-diaminodiphenylether,
3,3'-bis(trifluoromethyl)-4,4'-diaminodiphenylether,
3,3',5,5'-tetrakis(trifluoromethyl)-4,4'-diaminodiphenylether,
3,3'-bis(trifluoromethyl)-4,4'-diaminobenzophenone,
4,4''-diamino-p-terphenyl,
1,4-bis(p-aminophenyl)benzene,
p-bis(4-amino-2-trifluoromethylphenoxy)benzene,
bis(aminophenoxy)bis(trifluoromethyl)benzene,
bis(aminophenoxy)tetrakis(trifluoromethyl)benzene,
4,4'''-diamino-p-quaterphenyl,
4,4'-bis(p-aminophenoxy)biphenyl,
2,2-bis{4-(p-aminophenoxy)phenyl}propane,
4,4'-bis(3-aminophenoxyphenyl)diphenylsulfone,
2,2-bis{4-(4-aminophenoxy)phenyl}hexafluoropropane,
2,2-bis{4-(3-aminophenoxy)phenyl}hexafluoropropane,
2,2-bis{4-(2-aminophenoxy)phenyl}hexafluoropropane,
2,2-bis{4-(4-aminophenoxy)-3,5-dimethylphenyl}hexafluoropropane,
2,2-bis{4-(4-aminophenoxy)-3,5-ditrifluoromethylphenyl}hexafluoropropane,
4,4'-bis(4-amino-2-trifluoromethylphenoxy)biphenyl,
4,4'-bis(4-amino-3-trifluoromethylphenoxy)biphenyl,
4,4'-bis(4-amino-2-trifluoromethylphenoxy)diphenylsulfone,
4,4'-bis(3-amino-5-trifluoromethylphenoxy)diphenylsulfone,
2,2-bis{4-(4-amino-3-trifluoromethylphenoxy)phenyl}hexafluoropropane,
bis{(trifluoromethyl)aminophenoxy}biphenyl,
bis[{(trifluoromethyl)aminophenoxy}phenyl]hexafluoropropane,
diaminoanthraquinone,
1,5-diaminonaphthalene,
2,6-diaminonaphthalene,
bis[{2-(aminophenoxy)phenyl}hexafluoroisopropyl]benzene,
bis(2,3,5,6-tetrafluoro-4-aminophenyl)ether,
bis(2,3,5,6-tetrafluoro-4-aminophenyl)sulfide,
1,3-bis(3-aminopropyl)tetramethyldisiloxane,
1,4-bis(3-aminopropyldimethylsilyl)benzene,
bis(4-aminophenyl)diethylsilane,
tetrafluoro-1,2-phenylenediamine,
tetrafluoro-1,3-phenylenediamine,
tetrafluoro-1,4-phenylenediamine,
hexafluoro-1,5-diaminonaphthalene,
hexafluoro-2,6-diaminonaphthalene,
3-trifluoromethyl-trifluoro-1,2-phenylenediamine,
4-trifluoromethyl-trifluoro-1,2-phenylenediamine,
2-trifluoromethyl-trifluoro-1,3-phenylenediamine,
4-trifluoromethyl-trifluoro-1,3-phenylenediamine,
5-trifluoromethyl-trifluoro-1,3-phenylenediamine,
2-trifluoromethyl-trifluoro-1,4-phenylenediamine,
3,4-bis(trifluoromethyl)-difluoro-1,2-phenylenediamine,
3,5-bis(trifluoromethyl)-difluoro-1,2-phenylenediamine,
2,4-bis(trifluoromethyl)-difluoro-1,3-phenylenediamine,
4,5-bis(trifluoromethyl)-difluoro-1,3-phenylenediamine,
4,6-bis(trifluoromethyl)-difluoro-1,3-phenylenediamine,
2,3-bis(trifluoromethyl)-difluoro-1,4-phenylenediamine,
2,5-bis(trifluoromethyl)-difluoro-1,4-phenylenediamine,
3,4,5-tris(trifluoromethyl)-fluoro-1,2-phenylenediamine,
3,4,6-tris(trifluoromethyl)-fluoro-1,2-phenylenediamine,
2,4,5-tris(trifluoromethyl)-fluoro-1,3-phenylenediamine, 2,4,6-tris(trifluoromethyl)-fluoro-1,3-phenylenediamine,
4,5,6-tris(trifluoromethyl)-fluoro-1,3-phenylenediamine,
tetrakis(trifluoromethyl)-1,2-phenylenediamine,
tetrakis(trifluoromethyl)-1,3-phenylenediamine,
tetrakis(trifluoromethyl)-1,4-phenylenediamine,
3-pentafluoroethyl-trifluoro-1,2-phenylenediamine,
4-pentafluoroethyl-trifluoro-1,2-phenylenediamine,
2-pentafluoroethyl-trifluoro-1,3-phenylenediamine,
4-pentafluoroethyl-trifluoro-1,3-phenylenediamine,
5-pentafluoroethyl-trifluoro-1,3-phenylenediamine,
2-pentafluoroethyl-trifluoro-1,4-phenylenediamine,
3-trifluoromethoxy-trifluoro-1,2-phenylenediamine,
4-trifluoromethoxy-trifluoro-1,2-phenylenediamine,
2-trifluoromethoxy-trifluoro-1,3-phenylenediamine,
4-trifluoromethoxy-trifluoro-1,3-phenylenediamine,
5-trifluoromethoxy-trifluoro-1,3-phenylenediamine,
2-trifluoromethoxy-trifluoro-1,4-phenylenediamine,
3,3'-diamino-octafluorobiphenyl,
3,4'-diamino-octafluorobiphenyl,
4,4'-diamino-octafluorobiphenyl,
2,2'-bis(trifluoromethyl)-4,4'-diaminohexafluorobiphenyl,
3,3'-bis(trifluoromethyl)-4,4'-diaminohexafluorobiphenyl,
bis(3-amino-tetrafluorophenyl)ether,
3,4'-diamino-octafluorobiphenylether,
bis(4-amino-tetrafluorophenyl)ether,
3,3'-diamino-octafluorobenzophenone,
3,4'-diamino-octafluorobenzophenone,
4,4'-diamino-octafluorobenzophenone,
bis(3-amino-tetrafluorophenyl)sulfone,
3,4'-diamino-octafluorobiphenylsulfone,
bis(4-amino-tetrafluorophenyl)sulfone,
bis(3-amino-tetrafluorophenyl)sulfide,
3,4'-diamino-octafluorobiphenylsulfide,
bis(4-amino-tetrafluorophenyl)sulfide,
bis(4-aminotetrafluorophenyl)difluoromethane,
1,2-bis(4-aminotetrafluorophenyl)tetrafluoroethane,
2,2-bis(4-aminotetrafluorophenyl)hexafluoropropane,
4,4'-diamino-dodecafluoro-p-terphenyl,
4-amino-tetrafluorophenoxy-4'-amino-tetrafluorophenyl-difluoromethane,
bis(4-amino-tetrafluorophenoxy)-difluoromethane,
1,2-bis(4-amino-tetrafluorophenoxy)-tetrafluoroethane,
2,2-bis(4-amino-tetrafluorophenoxy)-hexafluoropropane,
1,4-bis(4-amino-tetrafluorophenoxy)-tetrafluorobenzene,
2,6-diamino-hexafluoronaphthalene,
2,6-diamino-octafluoroanthracene,
2,7-diamino-octafluorophenanthrene,
2,6-diamino-hexafluorobiphenylene,
2,7-diamino-hexafluorobenzofuran,
2,6-diamino-hexafluoroanthraquinone,
2,6-diamino-octafluoroanthrone,
2,7-diamino-hexafluorophenoxathiin,
2,7-diamino-hexafluorothianthrene, and
2,7-diamino-tetrafluorodibenzo[b,e]1,4dioxane.

To achieve a birefringence exceeding 0.03 required to realize a polyimide optical waveplate with a film thickness of 20 µm or smaller, which is characterized by the present invention, by drawing at a practical draw ratio, it is preferable that one or both of the tetracarboxylic acid or its derivative and the diamine have a highly linear structure in which the skeleton or main chain structure has no rotatable bond or has only one rotatable bond. For example, if two or more rotatable bonds are contained in the skeleton of the diamine (i.e., if any of an ether group, a thioether group, a methylene group, a sulfone group, a carbonyl group, an isopropylidene group, and a hexafluoroisopropylidene group is contained), preferable usable examples of the tetracarboxylic acid are a pyromellitic acid whose skeleton consists of one benzene ring, a derivative of this pyromellitic acid in which two hydrogen atoms bonded to that benzene ring are substituted with another organic substituent or halogen, 2,3,3',4'-biphenyltetracarboxylic acid whose skeleton is a biphenyl structure, and a derivative of this 2,3,3',4'-biphenyltetracarboxylic acid in which four hydrogen atoms bonded to the benzene ring of that biphenyl structure are substituted with another organic substituent or halogen. If the skeleton of an acid anhydride contains two or more rotatable bonds, examples of the diamine are preferably a diaminobenzene whose skeleton consists of one benzene ring, a derivative of this diaminobenzene in which four hydrogen atoms bonded to that benzene ring are substituted with another organic substituent or halogen, and a derivative in which the skeleton is a biphenyl structure and some or all of hydrogen atoms bonded to the benzene ring of that biphenyl structure are substituted with another organic group or halogen. As will be presented later in the examples of the present invention, however, even the use of a diamine whose skeleton is a biphenyl structure cannot achieve a birefringence greater than 0.03 in some cases if the skeleton of an acid anhydride is exceedingly flexible. Therefore, it is more favorable that both of the tetracarboxylic acid or its derivative and the diamine have a highly linear structure in which the skeleton has no rotatable bond or has only one rotatable bond.

In addition, to prevent a decrease in transparency to near-infrared light as a result of the absorption of moisture in the air and to extend the high-optical transparency region toward the low-wavelength side in a visible region, it is preferable that a fluorine atom be bonded to one or both of the tetracarboxylic acid or its derivative and the diamine as the materials. Especially when 2,2'-bis(trifluoromethyl)-4,4'-diaminodiphenyl is used as the diamine, as will be presented later in the examples of the present invention later, it is possible to obtain a polyimide film having a large in-plane birefringence, a high optical transparency, and a low water absorption. Also, to manufacture an optical waveplate whose absorption loss to near-infrared light containing optical communication wavelengths is reduced to a minimum possible limit, it is preferable that one or both of the tetracarboxylic acid or its derivative and the diamine, as the materials, be completely fluorinated except for an amino group.

A poly(amic acid) solution or film is manufactured by causing the tetracarboxylic acid or its derivative and the diamine as described above to react with each other. A method of manufacturing the poly(amic acid) can be the same as conventional poly(amic acid) manufacturing methods. Generally, a dianhydride of a tetracarboxylic acid is reacted with an equal molar quantity of a diamine in a polar organic solvent such as N-methyl-2-pyrrolidone, N,N-dimethylacetamide, or N,N-dimethylformamide. These materials can also be reacted in a vacuum, in a vapor phase, or at a high pressure in the absence of a solvent. In the present invention, both the tetracarboxylic acid or its derivative and the diamine need not be single compounds; that is, it is possible to mix a plurality of tetracarboxylic acids or their derivatives and diamines. In this case, the total number of moles of a plurality of diamines or one diamine must be equal or nearly equal to that of a plurality of tetracarboxylic acids or their derivatives or one tetracarboxylic acid or its derivative.

The resultant poly(amic acid) is then imidized to synthesize a polyimide. This synthesis can be performed by conventional polyimide synthesizing methods including thermal imidization. In the present invention, however, it is also possible to obtain a mixture of polyimides by imidizing a plurality of poly(amic acid)s in the form of a mixture, as well as imidizing a single poly(amic acid).

As a method of manufacturing a polyimide having birefringence in the plane of a film, it is effective to simultaneously or continuously perform uniaxial drawing and thermal imidization for a poly(amic acid) film containing a certain amount of a solvent. Specific methods that are found to be effective by the examples of the present invention are:

- a method of uniaxially drawing a poly(amic acid) film and then thermally imidizing the film with the film be fixed in either a uniaxial or biaxial directions by a metal frame or the like;
- a method of simultaneously performing drawing and imidization by performing thermal imidization for a poly(amic acid) film while the film is subjected to a tensile stress in a uniaxial direction;
- a method of simultaneously performing drawing and imidization by using shrinkage of a poly(amic acid) film and evaporation of a solvent caused by imidization taking place in the process of thermal imidization performed for the film by fixing it in only a uniaxial direction by a metal frame or the like; and
- a method of performing drawing and imidization by using the anisotropy of thermal expansion coefficient of a substrate occurring in the process of thermal imidization performed for a poly(amic acid) solution coated on the substrate having the anisotropy of thermal expansion coefficient in its plane.

Performing the drawing simultaneously with the thermal imidization is effective to obtain a large in-plane birefringence. However, performing the drawing for a polyimide film which is already imidized and has no in-plane birefringence is ineffective, since the consequent in-plane birefringence is small compared to that obtained by the above method. For a polyimide film which is already imidized and yet has a retardation close to the target value, however, performing the drawing again at a high temperature of 300° C. or higher is effective as a retardation adjusting method. It is also effective as a more precise retardation adjusting method to perform a thermal treatment for a polyimide film of the above sort at a high temperature of 300° C. or higher with no stress applied. This method makes use of a phenomenon in which a polyimide having a rigid structure spontaneously orients at a high temperature to increase the birefringence. Note that when any of these methods is to be used, it is preferable to adjust the drawing conditions or the temperature while externally monitoring the retardation of that polyimide film.

One example of a method of uniaxially drawing a poly (amic acid) film at around room temperature is a method in which a poly(amic acid) solution is coated on a substrate, the solvent is dried to some extent, and then the film is peeled from the substrate and drawn. Other examples are a method in which a poly(amic acid) solution is coated on a readily drawable polymer (e.g., polyvinyl alcohol or polycarbonate) substrate, the solvent is dried to some extent, the poly(amic acid) film is drawn together with the substrate, and then the film is peeled from the substrate; and a method in which a poly(amic acid) film peeled from a substrate is dipped in a solvent mixture of a good solvent and a poor solvent and drawn after the swell proceeds to a certain degree. Some other methods than the methods herein mentioned are also possible as the method of uniaxial drawing of a poly(amic acid) at around room temperature or uniaxial drawing of a poly(amic acid) film at a high temperature. That is, any method is usable in principle provided that the molecular chains of the poly(amic acid) or polyimide orient in the uniaxial direction. An example is a method in which a poly(amic acid) solution is coated on a substrate consisting of a heat-resistant plastic or a metal, the solvent is dried to some extent, and then the film is thermally imidized while it is drawn under a stress by bending it together with the substrate. Normal drawing operations using a roll drawing machine, a tenter drawing machine, and the like are also considered to be effective.

As the substrate having an anisotropy of thermal expansion coefficient in its plane, calcite is effective as will be described later in the examples of the present invention. Other effective examples are single-crystal materials such as a rock crystal, lithium niobate, lithium tantalate, and titanium oxide, and metal materials such as a fiber reinforced metal (FRM) in which glass fiber or the like is embedded in the uniaxial direction, as inorganic materials; and liquid-crystal polyester, liquid crystal polyacrylate, and fiber reinformed plastic (FRP) in which glass fiber or the like is embedded in the uniaxial direction, as organic materials. In addition, a piezoelectric material that expands or contracts in one direction upon being applied with a voltage and a pyroelectric material that expands or contracts in one direction upon being heated can also be considered to be effective as the substrate.

To obtain an optical waveplate consisting of a polyimide, it is normally required to match the retardation of the polyimide to a half or quarter of the wavelength of guided light. Therefore, control of the thickness of a film is important as well as control of the in-plane birefringence. The control of the film thickness of a polyimide is generally done by optimizing the spin-coating conditions of a poly(amic acid) solution as a precursor of the film. A film requiring more accurate film thickness control can be formed by shaping a drawn polyimide film, with a thickness slightly larger than a design value, to have a predetermined thickness by using reactive ion etching, UV asher, or oxygen asher.

The polyimide optical waveplate according to the present invention is manufactured for the purpose of primarily inserting it in the middle of the optical path of an optical waveguide or of a waveguide device. However, this polyimide optical waveplate can also be used intact as a conventional optical waveplate. It is also possible to use the polyimide optical waveplate as an optical retardation plate by adjusting the retardation of the plate to any given value rather than a half or quarter of the wavelength of guided light. In addition, since polyimides have a heat resistance of 300° C. or higher, it is possible to form a thin film or a multilayered film of a metal, a semiconductor, or a dielectric on the surface of a polyimide by sputtering or vapor deposition. Any of these films can be used as a reflecting film or a filter for cutting off light having a specific wavelength.

BRIEF DESCRIPTION OF THE DRAWINGS

FIG. 1 is a view showing the dependence of excess loss on the thickness of a waveplate when the waveplate is inserted into an optical waveguide;

FIGS. 2A and 2B are views for explaining the effect of orientation on a refractive index ellipsoid which represents the refractive index anisotropy of a polyimide film, in which FIG. 2A illustrates a refractive index ellipsoid of a polyimide film not subjected to the orientation, and FIG. 2B illustrates an ellipsoid of a polyimide film subjected to the orientation, assuming that the polyimide film is formed on a substrate;

FIG. 3 is a graph showing the relationship between the weight hung from a poly(amic acid) film and the resulting in-plane birefringence;

FIG. 4 is a graph showing the relationship between the heating rate during thermal imidization and the resulting in-plane birefringence;

DESCRIPTION OF THE PREFERRED EMBODIMENTS

Figure 5:
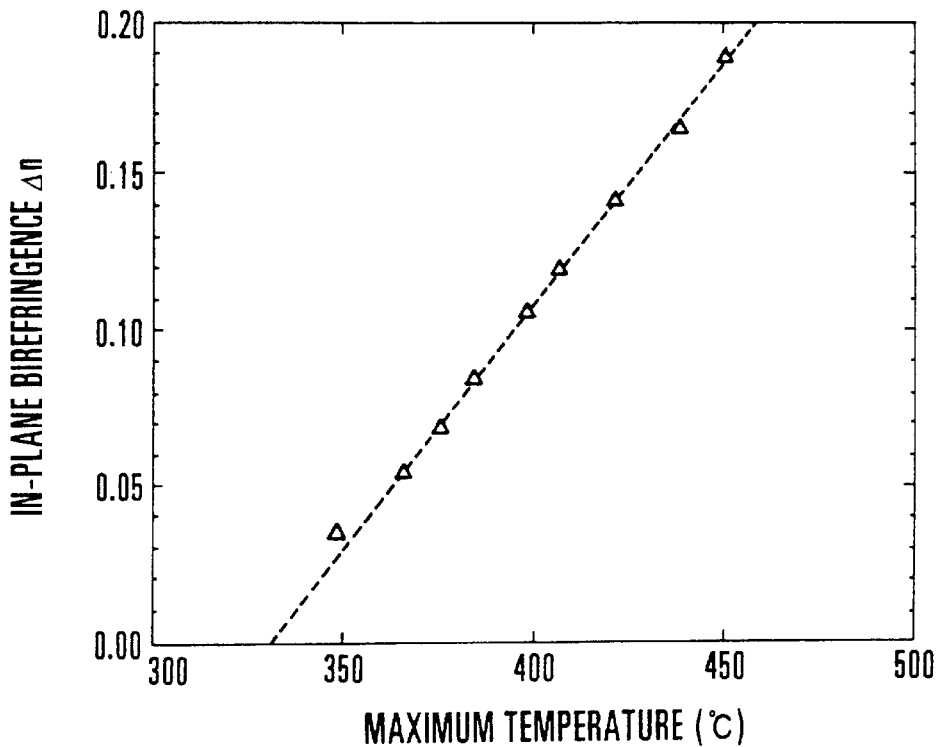
FIG. 5 is a graph showing the relationship between the maximum temperature during thermal imidization and the resulting in-plane birefringence.

The present invention will be described in more detail below by way of its examples. It is, however, obviously possible to obtain numerous optical waveplates of the present invention by using various polyimide combinations and by partially altering the drawing method. Therefore, the present invention is not limited to these examples.

The in-plane birefringence ($\Delta n$) of a polyimide film was obtained by calculating the difference between the refractive index ($n_{TE1}$) obtained when TE polarized light was incident in a drawing direction and the refractive index ($n_{TE2}$) obtained when TE polarized light was incident in a direction perpendicular to the drawing direction. The refractive index was measured at a room temperature of 23° C. and a wavelength of 1.55 $\mu$m by using a prism coupler (PC-2000) manufactured by Metricon Co. The film thickness (d) of a polyimide film was measured with the prism coupler described above, if the thickness was 20 $\mu$m or less, and was measured with a dial gauge available from Peacock Co., if the thickness was larger than 20 $\mu$m. A retardation ($\Delta n \times d$) required to accomplish the function as an optical waveplate can be calculated by multiplying $\Delta n$ by d obtained by the above methods. The retardation, however, can be more directly obtained by, e.g., a "Senarmont method", an "optical interference method", a "rotary analyzer method", a "phase modulating method", or a "parallel Nicole rotation method". In each example, the retardation was measured by the "parallel Nicole rotation method" by using a laser diode with a wavelength of 1.55 $\mu$m as a light source and two Glan Thomson prisms as analyzers. Of the polyimides used in the examples, a fluorinated polyimide using 2,2'-bis(trifluoromethyl)-4,4'-diaminodiphenyl as a diamine has a heat resistance higher than 300° C. and a water absorption of 0.7% or less. This has already been reported "Macromolecules" [T. Matsuura et al., Vol. 24, p. 5,001 (1991) and T. Matsuura et al., Vol. 25, p. 3,540 (1992)].

EXAMPLE 1

An N,N-dimethylacetamide solution of a poly(amic acid) synthesized from pyromellitic dianhydride (PMDA) represented by the following formula:

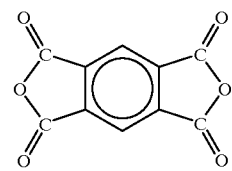

and 2,2'-bis(trifluoromethyl)-4,4'-diaminobiphenyl (TFDB) represented by the following formula:

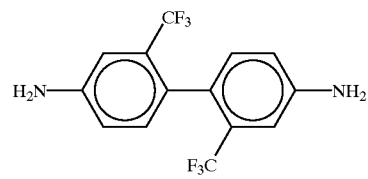

was coated on a silicon wafer 4 inches in diameter by a spin coating method. A thermal treatment was performed for the resultant film at 70° C. for one hour to evaporate the solvent to such an extent that the film could be peeled. The peeled film was cut into a stripe 6 cm long and 3 cm wide and uniaxially drawn at room temperature by a tensile tester (Instron). Consequently, an elongation of 10% was observed. The resultant film stripe was fixed to a rectangular metal frame and thermally imidized at a maximum temperature of 350° C. for one hour. The $\Delta n$ of the resultant film was found to be 0.145. Assuming that the Δn of this polyimide remains unchanged, a film thickness of 5.3 μm is necessary to use the film as a half waveplate with a wavelength of 1.55 μm. Therefore, the spin coating conditions for the poly(amic acid) solution were changed such that the film thickness after the drawing imidization became 5.3 μm, and the drawing (elongation 10%) and the thermal treatment identical with those discussed above were again performed. Consequently, a polyimide film with Δn×d=0.775 was obtained. Subsequently, linearly polarized light with a wavelength of 1.55 μm was radiated to be incident on the resultant film such that the polarization plane was inclined 45° from the drawing axis of the film. Consequently, it was found that the film could be used as a half waveplate, since the polarization plane after the transmission rotated 90°. Independently, a groove 20 μm wide and 150 μm deep was cut in a silica-based buried optical waveguide at a right angle with respect to the longitudinal direction of the waveguide. The above polyimide film was so cut that its drawing axis formed an angle of 45° with the waveguide substrate. The resultant film was then inserted into the groove, and the excess loss was measured. Consequently, the excess loss was found to be 0.3 dB.

Note that the excess loss remained unchanged even when the angle of the groove with respect to the longitudinal direction of the waveguide was altered between 80° and 90°.

EXAMPLE 2

A peeled film of a poly(amic acid) formed following the same procedures as in Example 1 was cut into a stripe 6 cm long and 3 cm wide. One end of the stripe was fixed as the upper end to a metal frame, and its other end was pinched between two metal pieces to attach a weight of 120 g. In this manner, a tensile stress was applied to the film by hanging the weight from the film. The film held in this state was placed in a heating oven containing a nitrogen atmosphere and heated to a maximum temperature of 350° C. at a heating rate of 4° C./min. Thereafter, thermal imidization was performed by holding the film at 350° C. for one hour. The Δn of the resultant film was found to be 0.037. Assuming that the Δn of this polyimide remains unchanged, a film thickness of 10.5 μm is required to use the film as a quarter waveplate with a wavelength of 1.55 μm. Therefore, the spin coating conditions for the poly(amic acid) solution were altered such that the film thickness after the thermal imidization became 10.5 μm, and the above treatments were again performed by changing the weight such that the same stress was applied to the film per unit sectional area. Consequently, a polyimide film with Δn×d=0.388 was obtained.

Linearly polarized light with a wavelength of 1.55 μm was guided to become incident on the resultant film such that the polarization plane was inclined 45° from the drawing axis of the film. Consequently, it was found that the film could be used as a quarter waveplate, since circularly polarized light was obtained after the transmission. Following the same procedures as in Example 1, an excess loss caused by insertion of the film into an optical waveguide was measured and found to be 0.3 dB.

EXAMPLE 3

The following examinations were made in order to uncover the effects that the weight, the heating rate, and the maximum temperature had on the Δn of the polyimide in the optical waveplate manufacturing method discussed in Example 2. First, the weight was changed from 30 g to 240 g with the heating rate and the maximum temperature fixed at 4° C./min and 350° C., respectively.

As shown in FIG. 3, the Δn of the polyimide has a linear relation to the weight and can be controlled over the range of 0.017 to 0.070. Subsequently, while the weight and the maximum temperature were fixed at 120 g and 350° C., respectively, the heating rate was altered from 4° C./min to 40° C./min. As shown in FIG. 4, the Δn of the polyimide has a linear relation to the heating rate and can be controlled over the range of 0.037 to 0.063. Lastly, the maximum temperature was changed from 350° C. to 450° C. with the weight and the heating rate fixed at 120 g and 4° C./min, respectively. As shown in FIG. 5, the Δn of the polyimide has a linear relation to the maximum temperature and can be controlled over the range of 0.037 to 0.189. It is apparent from these results that the retardation of a polyimide film can be controlled by adjusting its Δn. As illustrated in FIG. 3, the method of changing the weight is easier to realize and can precisely control the Δn. In addition, the changeable range of Δn is sufficient to manufacture an optical waveplate with a film thickness of 10 to 20 μm. The method of changing the heating rate is also excellent in controllability, although the changeable range of Δn is slightly narrow, as in FIG. 4. The method of changing the maximum temperature is inferior in precise controllability to the other two methods, as illustrated in FIG. 5. However, the changeable range of Δn obtained by this method is very wide, so the method is suitable for the manufacture of a waveplate with a film thickness of 10 μm or smaller. At a maximum temperature of 450° C., for example, it is possible to decrease the thickness of a half waveplate with a wavelength of 1.30 μm to as small as 3.4 μm.

EXAMPLE 4

Figure 6:
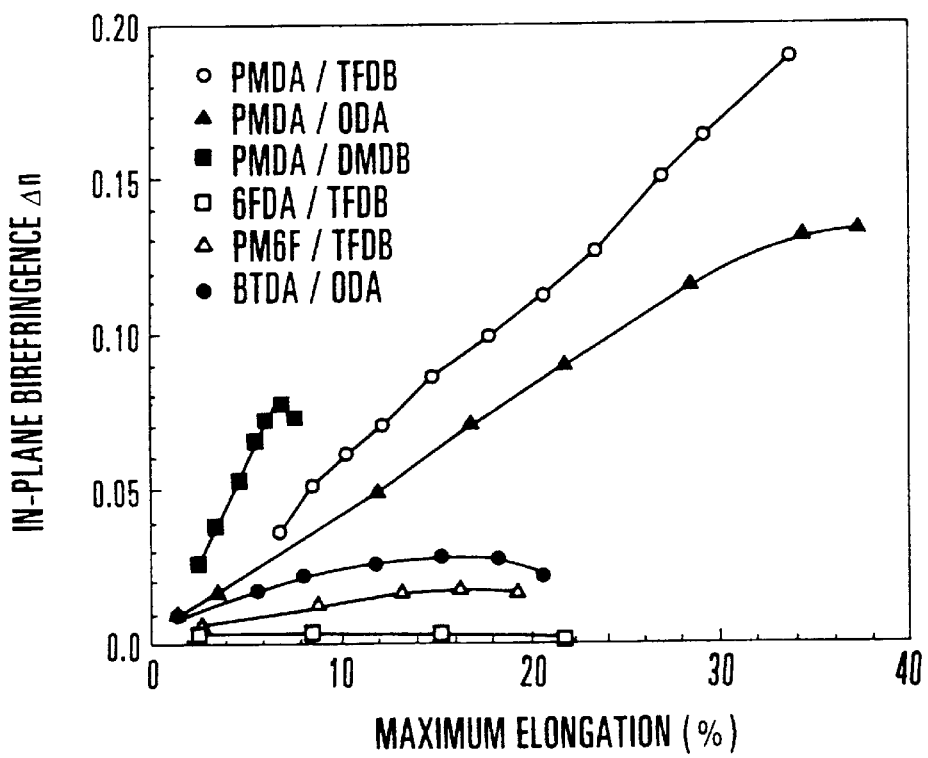
FIG. 6 is a graph showing the relationship between the maximum elongation of a polyimide film during thermal imidization and the resulting in-plane birefringence.

The following examinations were made in order to reveal the molecular structure of the polyimide and the resultant Δn in the optical waveplate manufacturing method discussed in Example 2. 25-μm thick films were prepared by using, in addition to the poly(amic acid) (PMDA/TFDB) synthesized from PMDA and TFDB in Example 2, a poly(amic acid) (PMDA/ODA) synthesized from PMDA and 4,4'-diaminodiphenylether (ODA) represented by the following formula:

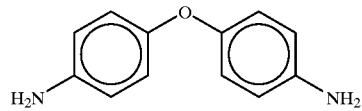

a poly(amic acid) (PMDA/DMDB) synthesized from PMDA and 2,2'-dimethyl-4,4'-diaminobiphenyl (DMDB) represented by the following formula:

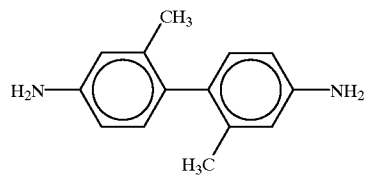

a poly(amic acid) (BTDA/ODA) synthesized from 3,3',4,4'-benzophenonetetracarboxylic dianhydride (BTDA) represented by the following formula:

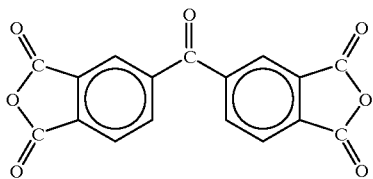

and ODA,
a poly(amic acid) (6FDA/TFDB) synthesized from 2,2-bis (3,4-dicarboxyphenyl)hexafluoropropane dianhydride (6FDA) represented by the following formula:

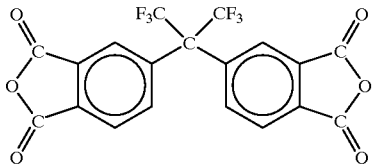

and TFDB, and
a poly(amic acid) (PM6F/TFDB) synthesized from an equal molar mixture of PMDA and 6FDA, and TFDB. Following the same procedures as in Example 3, the maximum temperature was altered between 350° C. and 450° C. with the weight and the heating rate fixed at 120 g and 4° C./min, respectively. FIG. 6 is a graph showing curves each plotting the Δn of one of the resultant polyimide films as a function of the maximum elongation of that film during thermal imidization. That is, FIG. 6 represents the relationship between the maximum elongation (%, plotted on the abscissa) of the polyimide film during thermal imidization and the obtained in-plane birefringence Δn (plotted on the ordinate). As illustrated in FIG. 6, three types of the polyimides PMDA/TFDB, PMDA/ODA, and PMDA/DMDB using PMDA as an acid anhydride can be used as the material of a polyimide optical waveplate with a film thickness of 20 μm or smaller, since they can achieve a Δn greater than 0.03 by drawing. Of these polyimides, in PMDA/ODA and PMDA/CMDB, the Δn tends to saturate by drawing to a certain degree. However, no such tendency of saturation in Δn is found when PMDA/TFDB is used, even if the elongation exceeds 30%. The reason for this can be assumed that PMDA/TFDB has a linear rigid structure and also has a trifluoromethyl group on its side chain, so the interaction between molecular chains is relatively weak, and this allows the molecular chains to orient efficiently upon drawing.

Even if the diamine is the rigid TFDB, on the other hand, when the acid anhydride used is 6FDA, no birefringence greater than 0.03 can be achieved since the skeleton or main chain structure of 6FDA is very flexible. This hindering effect that 6FDA has on Δn is large; although the equal molar quantities of PMDA and 6FDA are contained in PM6F/TFDB, the increase in Δn of PM6F/TFDB with respect to the elongation is closer to that of 6FDA/TFDB than to that of PMDA/TFDB. Likewise, in the case of BTDA/ODA in which two rotatable bonds are contained in each of the acid anhydride and the diamine, it is not possible to achieve a birefringence exceeding 0.03. It is assumed that the Δn decreased when the elongation exceeded 20% because this polyimide was heated up to its glass transition temperature or higher, so the orientation of molecular chains formed by the drawing was relaxed.

Figure 7:
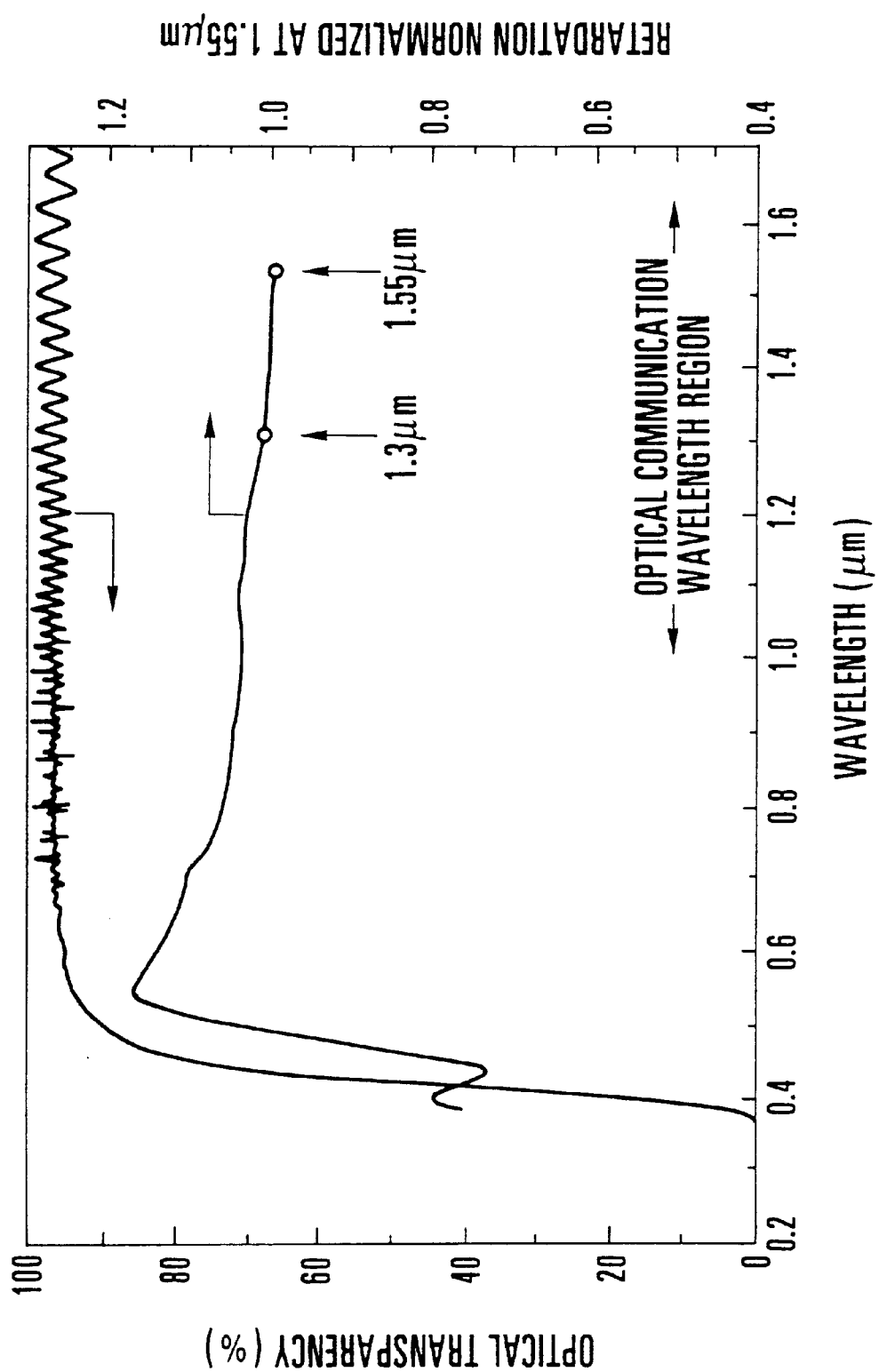
FIG. 7 is a graph showing the wavelength dependence of both the optical transparency and the retardation of a PMDA/TFDB film having an in-plane birefringence.
Figure 8:
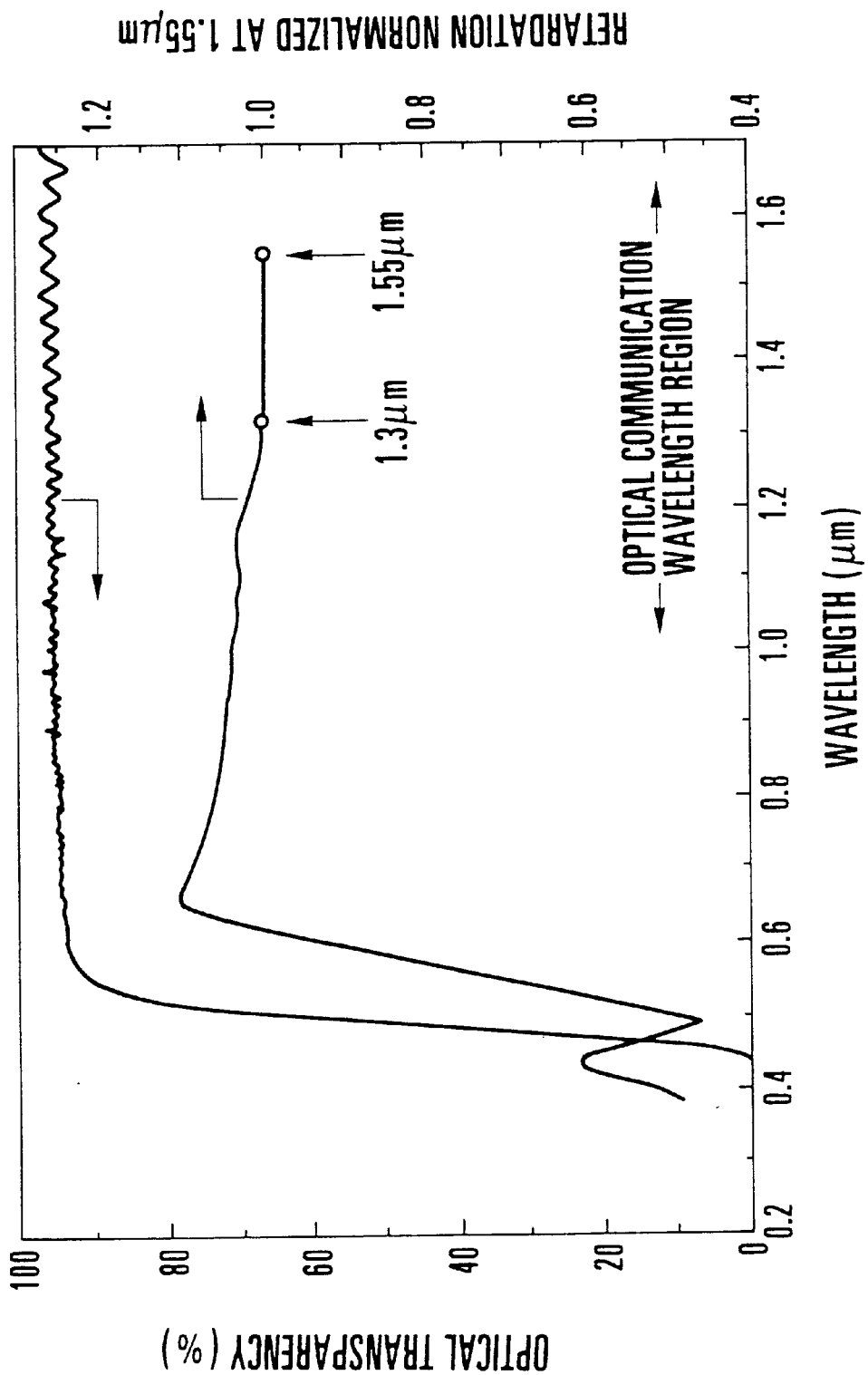
FIG. 8 is a graph showing the wavelength dependence of both the optical transparency and the retardation of a PMDA/ODA film having an in-plane birefringence.

FIGS. 7 and 8 are graphs showing plots of the wavelength dependence of both the optical transparency and the retardation measured for 15-μm thick polyimide films consisting of PMDA/TFDB and PMDA/ODA, respectively, manufactured by the above method. Referring to FIGS. 7 and 8, the abscissa indicates the wavelength (μm), and the ordinate indicates the optical transparency (%) or the retardation normalized with 1.55 μm. Interference fringes are found in the wavelength dependence of the optical transparency with respect to the film thickness. The Δn at a wavelength of 1.55 μm is about 0.05 in either polyimide, and the retardation is normalized with the value at 1.55 μm. It is apparent from FIGS. 7 and 8 that either polyimide has an optical transparency of 95% or more and a sufficient retardation in the almost entire optical communication wavelength region. In particular, the wavelength at the absorption peak, at which the optical transparency abruptly decreases, of PMDA/TFDB containing fluorine in its molecular structure is lower by about 0.06 μm than that of PMDA/ODA containing no fluorine. In addition, the wavelength of PMDA/TFDB, at which the retardation abruptly decreases, is also lower by about 0.1 μm than that of PMDA/ODA. Therefore, the wavelength region of PMDA/TFDB usable as a waveplate or a retardation plate is widened accordingly.

Separately, the 15-μm thick polyimide films of PMDA/TFDB, PMDA/ODA, and PMDA/DMDB manufactured by the above method were dipped in water at room temperature and left to stand for ten days. Thereafter, the water absorption of each resultant film was measured. Consequently, the water absorptions of PMDA/TFDB, PMDA/ODA, and PMDA/DMDB were found to be 0.6 wt %, 2.6 wt %, and 2.0 wt %, respectively. This demonstrates that introducing the fluorine-containing group to the polyimide molecular structure is effective in preventing absorption of water.

EXAMPLE 5

Figure 9:
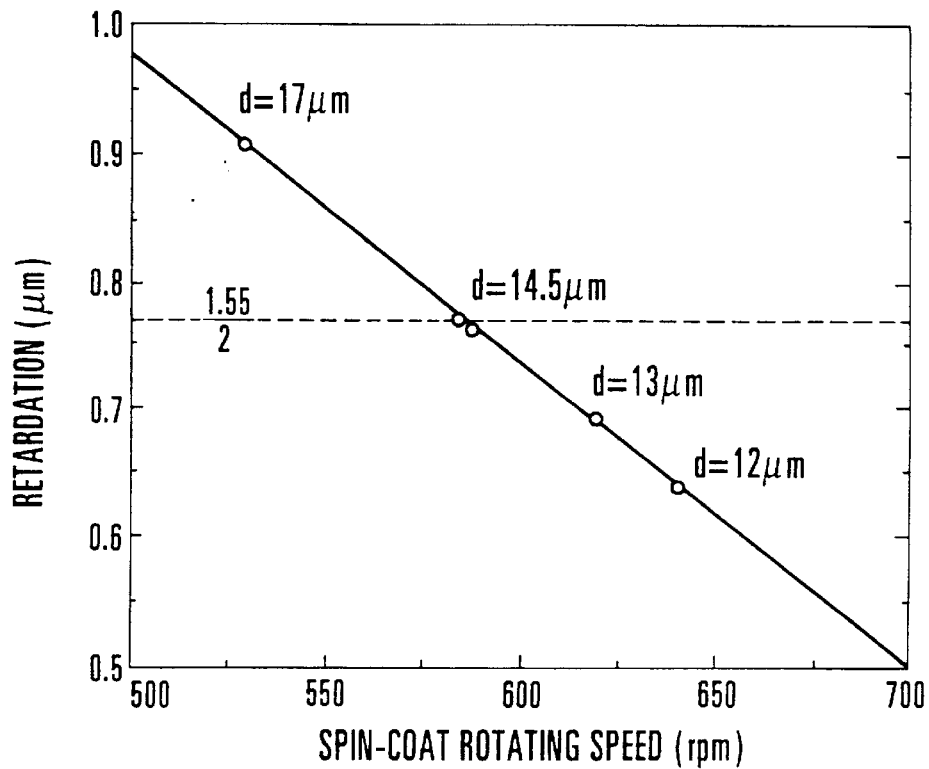
FIG. 9 is a graph showing the relationship between the spin-coat rotating speed for a poly(amic acid) solution and the retardation of a polyimide film.

A peeled film of a poly(amic acid) formed following the same procedures as in Example 1 was cut into a stripe 6 cm long and 3 cm wide. This film stripe was fixed in only a uniaxial direction to a rectangular metal frame and thermally imidized at a maximum temperature of 350° C. The Δn of the resultant film was found to be 0.053. FIG. 9 shows the film thickness and the retardation of the polyimide film when the spin coating conditions for the poly(amic acid) solution were changed. Referring to FIG. 9, the spin-coat rotating speed (rpm) is plotted on the abscissa, and the retardation (μm) is plotted on the ordinate. As shown in FIG. 9, the retardation and the spin-coat rotating speed have a linear relation, so it is possible to control the retardation of the polyimide with a high accuracy by changing the spin-coat rotating speed. FIG. 9 also reveals that since the retardation increases in proportion to the film thickness, a fixed Δn appears constantly even if the film thickness changes. As can be seen from FIG. 9, a film thickness of 14.5 μm is required to manufacture a half waveplate with a wavelength of 1.55 μm. Therefore, the above treatments were again performed by setting the spin-coat rotating speed for the poly(amic acid) solution at 570 rpm. Subsequently, linearly polarized light with a wavelength of 1.55 μm was radiated on the resultant polyimide film such that the polarization plane was inclined 45° from the drawing axis of the film. Consequently, it was found that this film could be used as a half waveplate, since the polarization plane after the transmission rotated 90°. Following the same procedures as in Example 1, an excess loss caused by insertion of the film into an optical waveguide was measured and found to be 0.3 dB.

Figure 10:
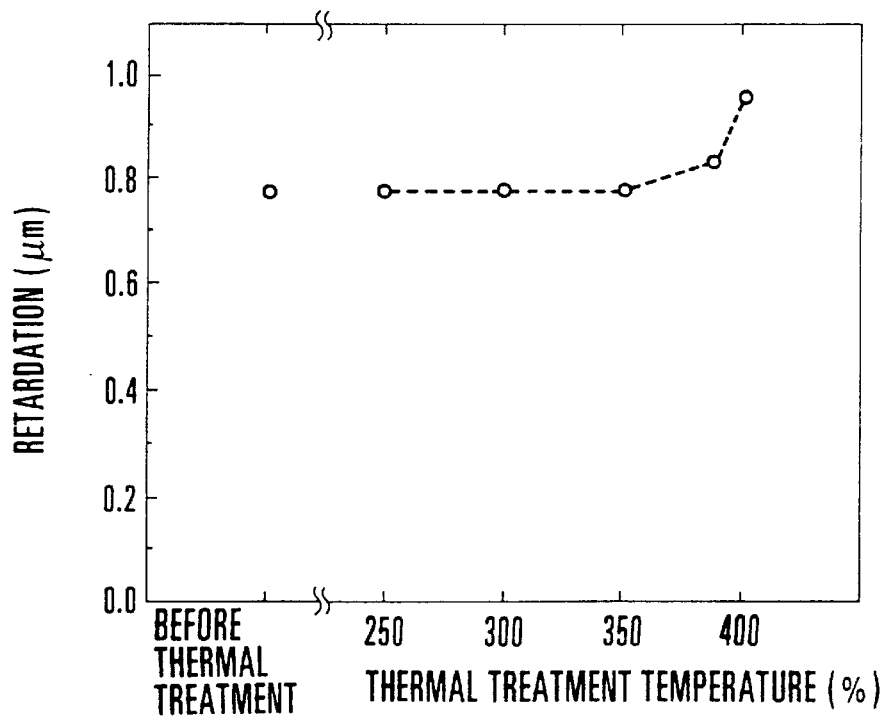
FIG. 10 is a graph showing the relationship between the thermal treatment temperature and the retardation.

The half waveplates manufactured by the above method were thermally treated at temperatures of 250° C., 300° C., 350° C., 380° C., and 400° C. each for 1 hour and cooled, and the retardation of each resultant waveplate was measured. The measurement results are shown in FIG. 10. As shown in FIG. 10, up to a temperature of 350° C. as the maximum temperature in the manufacture of waveplates, the retardation remained unchanged, and no change was found in both the film shape and the optical transparency. Therefore, this half waveplate has a heat resistance of 350° C. However, increases in the retardation were observed in the waveplates thermally treated at 380° C. and 400° C. This means that the molecular chains of the polyimide spontaneously oriented due to the thermal treatment at temperatures higher than the maximum temperature, resulting in an increased birefringence. This spontaneous orientation of polyimides at high temperatures can be used in adjustment of the retardation, as will be described later in Example 8.

EXAMPLE 6

A poly(amic acid) solution prepared following the same procedures as in Example 1 was coated on a calcite substrate 5 cm in both length and width and 3 mm in thickness, in which the crystal c axis was exposed to the plane. The resultant substrate was thermally imidized at a maximum temperature of 350° C. The $\Delta n$ of the resultant film was found to be 0.031. A film thickness of 12.5 $\mu$m is required to use this polyimide film as a quarter waveplate with a wavelength of 1.55 $\mu$m. Therefore, the above treatments were again performed by altering the spin coating conditions for the poly(amic acid) solution such that the film thickness after the thermal imidization became 12.5 $\mu$m. Subsequently, linearly polarized light with a wavelength of 1.55 $\mu$m was radiated on the resultant film such that the polarization plane was inclined 45° from the drawing axis of the film. Consequently, it was found that the film could be used as a quarter waveplate, since circularly polarized light was obtained after the transmission. Following the same procedures as in Example 1, an excess loss caused by insertion of the film into an optical waveguide was measured and found to be 0.3 dB.

EXAMPLE 7

A poly(amic acid) solution prepared following the same procedures as in Example 1 was cast on a polycarbonate support film by using a continuous film formation apparatus of a solvent casting type, and passed through a drying bath at 70° C., thereby forming a film 50 cm in width and 25 $\mu$m in thickness. Thereafter, the poly(amic acid) film was peeled from the support film, fixed at its right and left sides in the direction of width of 50 cm by a chuck, and passed through low- and high-temperature baths at 180° C. and 350° C., respectively. The resultant film was found to be drawn in the direction of width of 50 cm and had a thickness of 14 $\mu$m in its central portion and a $\Delta n$ of 0.045. A $\Delta n$ of 0.055 is necessary to use this film as a half waveplate with a wavelength of 1.55 $\mu$m. Therefore, the polyimide film was cut into a stripe 6 cm long and 3 cm wide with the drawing direction of the film as the longitudinal direction. One end of the film stripe was fixed as the upper end to a metal frame, and its other end was pinched between metal pieces to attach a weight of 120 g. In this manner, a tensile stress was applied to the film by hanging the weight from the film. The film held in this state was placed in a heating oven containing a nitrogen atmosphere and heated at a heating rate of 4° C./min. Silica windows 5 cm in diameter are formed in the right and left sides of this heating oven, and laser light of 1.55 $\mu$m is radiated through the polyimide film through these windows. A polyimide film being thermally treated can be measured by retardation measurement systems arranged on the right and the left sides of the heating oven with the film kept placed in the oven. The retardation began increasing when the atmospheric temperature exceeded 350° C., and became 0.775 at 365° C. At that point, the heating was stopped, and the film was naturally cooled to room temperature. When the $\Delta n$ was again measured, the change in retardation was found to be 1% or less. Subsequently, linearly polarized light with a wavelength of 1.55 $\mu$m was radiated on the resultant polyimide film such that the polarization plane was inclined by 45° from the drawing axis of the film. Consequently, it was found that this film could be used as a half waveplate, since the polarization plane after the transmission rotated 90°. Following the same procedures as in Example 1, an excess loss caused by insertion of the film into an optical waveguide was measured and found to be 0.3 dB.

EXAMPLE 8

A polyimide film with a thickness of 14 $\mu$m and a $\Delta n$ of 0.045 manufactured following the same procedures as in Example 7 was cut into a stripe 6 cm long and 3 cm wide with the drawing direction of the film as the longitudinal direction. Both the ends in the direction of the drawing axis of the film stripe were fixed to a metal frame. The film held in this state was placed in a heating oven containing a nitrogen atmosphere and heated at a heating rate of 4° C./min. The retardation began increasing when the atmospheric temperature exceeded 350° C., and became 0.775 at 400° C. At that point, the heating was stopped, and the film was naturally cooled to room temperature. When the $\Delta n$ was again measured, the change in retardation was found to be 1% or less. Subsequently, linearly polarized light with a wavelength of 1.55 $\mu$m was radiated on the resultant polyimide film such that the polarization plane was inclined by 45° from the drawing axis of the film. Consequently, it was found that this film could be used as a half waveplate, since the polarization plane after the transmission rotated 90°. Following the same procedures as in Example 1, an excess loss caused by insertion of the film into an optical waveguide was measured and found to be 0.3 dB.

EXAMPLE 9

Figure 11:
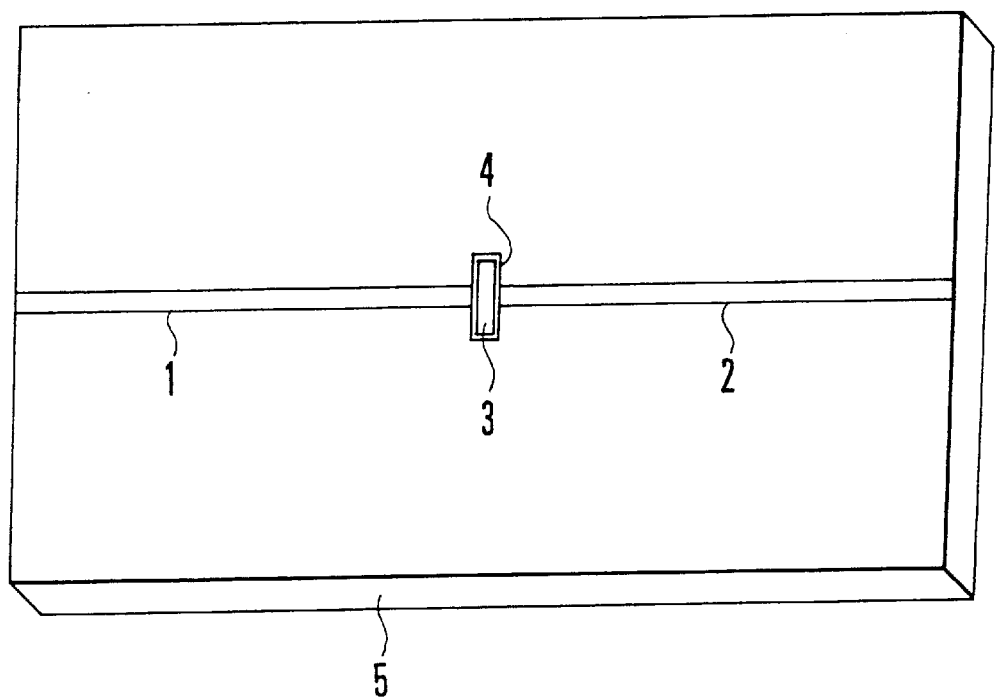
FIG. 11 is a view showing a polarization convertor using a polyimide half waveplate according to the present invention.

FIG. 11 is a view showing the ninth example of the present invention. This example is a polarization convertor constituted by one single-mode waveguide formed on a 1-mm thick silicon substrate. That is, FIG. 11 is a schematic view showing a polarization convertor using a polyimide half waveplate according to the present invention. Referring to FIG. 11, reference numeral 1 denotes an input waveguide; 2, an output waveguide; 3, a polyimide half waveplate; 4, a groove; and 5, a silicon substrate.

This waveguide is a silica-based waveguide formed by flame hydrolysis deposition and reactive ion etching. The waveguide has a sectional structure in which a core with dimensions of 7 $\mu$m×7 $\mu$m is buried in substantially the center of a 60-$\mu$m thick cladding layer deposited on the silicon substrate. The specific refractive index difference between the cladding and the core is 0.75%. A groove 20 $\mu$m wide and 150 $\mu$m deep is formed in the middle of the optical path so as to form an angle of 86° with the optical waveguide. This angle formed between the groove and the optical waveguide is preferably an angle slightly shifted from 90° in order to reduce light reflected by the surface of the waveplate. If, however, the angle is largely shifted from 90°, the retardation of the waveplate also is shifted from the design value. Therefore, an angle from 80° to 86° is normally used. In addition, a similar effect can be obtained when the groove is formed to be not perpendicular to but slightly inclined from the substrate. This is obvious from the above explanation. This groove can be formed by either chemical processing, such as etching, or mechanical processing using, e.g., a dicing saw. In this example, the groove was formed by a dicing saw using a blade 15 $\mu$m in thickness. The 14.5-$\mu$m polyimide half waveplate manufactured in Example 5 and so cut that its optical principal axis formed an angle of 45° with the substrate was inserted into the groove.

A polarization-maintaining single-mode optical fiber was connected to the input waveguide 1 of this polarization convertor, and polarized light (horizontal polarization) having an electric field parallel to the waveguide substrate 5 was input. Consequently, polarized light (vertical polarization) having an electric field perpendicular to the waveguide substrate 5 emerged from the output waveguide 2. Likewise, horizontal polarization emerged from the output waveguide 2 when vertical polarization was input. A polarization mode conversion ratio indicative of the efficiency at which horizontal polarization was converted into vertical polarization or vice versa was measured and found to be 30 dB. An excess loss caused by insertion of the polyimide half waveplate 3 into the groove 4 was found to be 0.3 dB.

EXAMPLE 10

Figure 12:
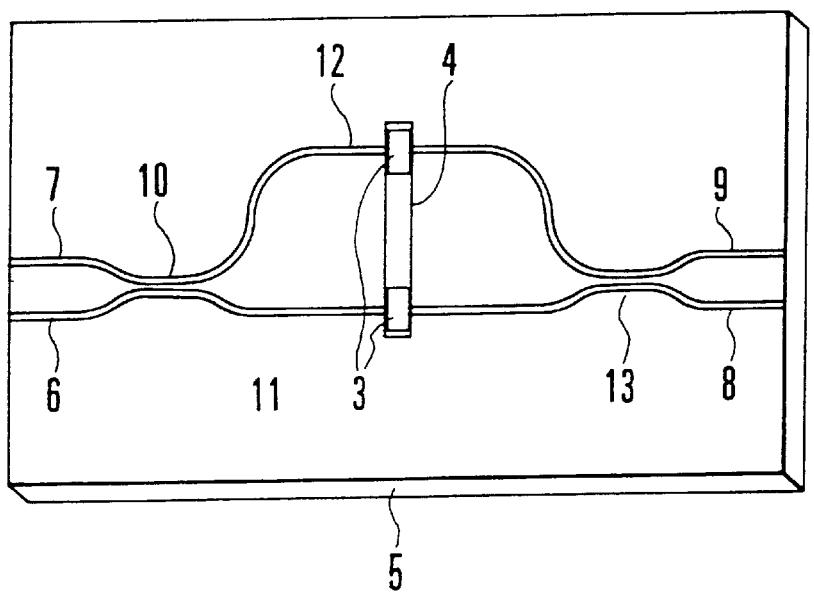
FIG. 12 is a view showing a polarization-independent waveguide multi/demultiplexer using a Mach-Zender interferometer according to the present invention.

FIG. 12 is a view showing the tenth example of the present invention. In this example, the polarization convertor of the present invention was applied to a waveguide multi/demultiplexer using a Mach-Zender interferometer constituted by two single-mode optical waveguides. That is, FIG. 12 is a schematic view showing a polarization-independent waveguide multi/demultiplexer using the Mach-Zender interferometer according to the present invention. Referring to FIG. 12, reference numerals 3 to 5 denote the same parts as in FIG. 11; 6, a first input waveguide; 7, a second input waveguide; 8, a first output waveguide; 9, a second output waveguide; 10, a first directional coupler; 11, a first optical path; 12, a second optical path; and 13, a second directional coupler. The too waveguides constitute the first input waveguide 6, the second input waveguide 7, the first directional coupler 10, the second directional coupler 13, the first optical path 11, the second optical path 12, the first output waveguide 8, and the second output waveguide 9. The coupling ratios of both the first and second directional couplers 10 and 13 are 50%. The length of the first optical path 11 is different by $\Delta L$ from that of the second optical path 12. A groove 4 is formed in the middle of the first and second optical paths 11 and 12, and a polyimide half waveplate 3 is inserted into the groove. The dimensions, the manufacturing conditions, and the propagation characteristics of the waveguides, the angle formed between the optical principal axis of the waveplate and the waveguide substrate, the shapes of the groove and the waveplate, the angle formed between the groove and the waveguides, and the characteristics of the waveplate used in this example are the same as those in Example 9. The polyimide optical waveplate 3 acts as a polarization convertor to convert horizontal polarization of guided light propagating through the first and second optical paths 11 and 12 into vertical polarization, and vertical polarization into horizontal one. An optical fiber is connected to the first input waveguide 6. Note that connecting an optical fiber to the second input waveguide 7 has no influence on the operation of the waveguide multi/demultiplexer of this example, although the first and second outputs change places with each other in the following description. The guided light from the first input waveguide 6 is equally divided in power by the first directional coupler 10. The divided light components independently propagate through the first and second optical paths 11 and 12 and are again coupled together by the second coupler 13. The resultant light is extracted from the first and second output waveguides 8 and 9.

Assume that there is no polarization convertor using the polyimide optical waveplate. In this case, since the silica-based waveguides formed on the silicon substrate have birefringence, the refractive index to horizontal polarization differs from that to vertical polarization. Consequently, the optical path length difference between the first and second optical paths when horizontal polarization is incident is different from that when vertical polarization is incident. This gives the multi/demultiplexer a polarization dependence. In this case, the optical path length is a value calculated by multiplying the distance the light is guided by the refractive index, and is proportional to the phase delay caused by the propagation of light. In contrast, when the polarization convertor is arranged in the middle of the first and second optical paths, as in FIG. 12, the optical path length difference for horizontal polarization is equal to that for vertical polarization. This is so because light incident by horizontal polarization is subjected to the refractive index as that of horizontal polarization in the first half of the optical path but to the refractive index as that of vertical polarization in the last half, so the total optical path length is the product of the mean refractive index and the physical length. Similarly, the optical path length for light incident by vertical polarization is also the product of the mean of the refractive index for horizontal polarization and that for vertical polarization and the physical length. Consequently, the multi/demultiplexer of this example becomes polarization-independent.

Figure 13:
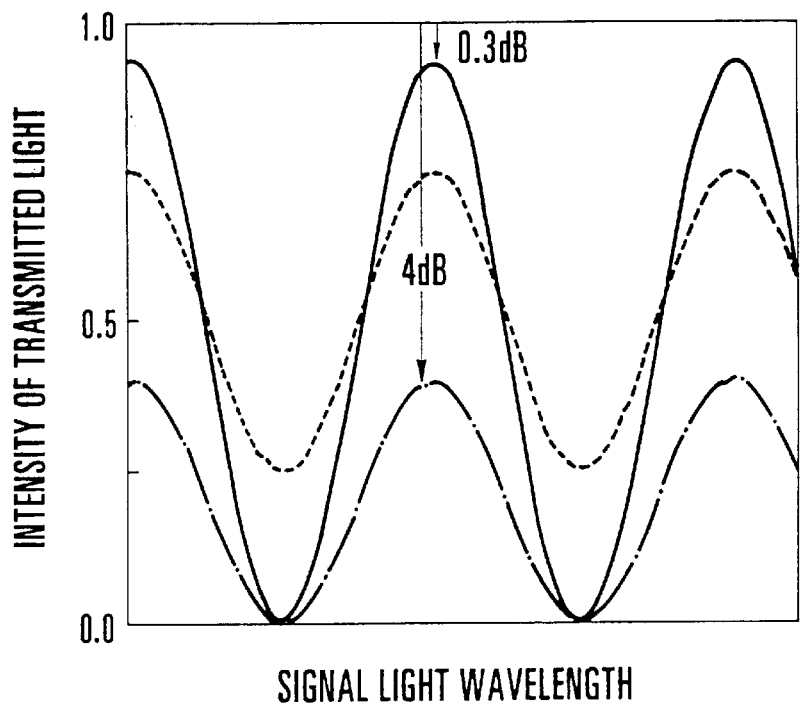
FIG. 13 is a graph showing the demultiplexing characteristics of the waveguide multi/demultiplexer shown in FIG. 12.

FIG. 13 is a graph showing the demultiplexing characteristics of the waveguide multi/demultiplexer illustrated in FIG. 12. Referring to FIG. 13, the abscissa indicates the signal light wavelength, and the ordinate indicates the intensity of transmitted light. The curves in FIG. 13 represent the multi/demultiplexing characteristic when the polarization convertor using the polyimide optical waveplate is present (a solid line), that when a polarization convertor using a conventional rock-crystal optical waveplate is present (an alternate long and short dashed line), and that when there is no polarization convertor (a dotted line). The results of FIG. 13 were obtained by inputting equal light quantities of horizontal polarization and vertical polarization as input light from the first input waveguide, and measuring the output from the first output waveguide. The horizontal and vertical polarizations have their respective transmission spectra represented by sinusoidal waves. In the absence of the polarization convertor, however, the transmission spectrum of the horizontal polarization differs from that of the vertical polarization. Consequently, the total transmission spectrum represented by the sum of these transmission spectra has a low extinction ratio. The extinction ratio is the ratio of the output at a wavelength at which light is output most intensely to the output at a wavelength at which light is output most weakly. When there is the polarization convertor using the rock-crystal optical waveplate, the extinction ratio rises because the transmission spectra of the horizontal and vertical polarizations agree with each other.

Since, however, the rock-crystal waveplate is thick, the excess loss becomes as large as 4 dB. On the other hand, when the polarization convertor using the polyimide optical waveplate is present, the polarization dependence is eliminated, and this results in a high extinction ratio and a very small excess loss of 0.3 dB.

EXAMPLE 11

Figure 14:
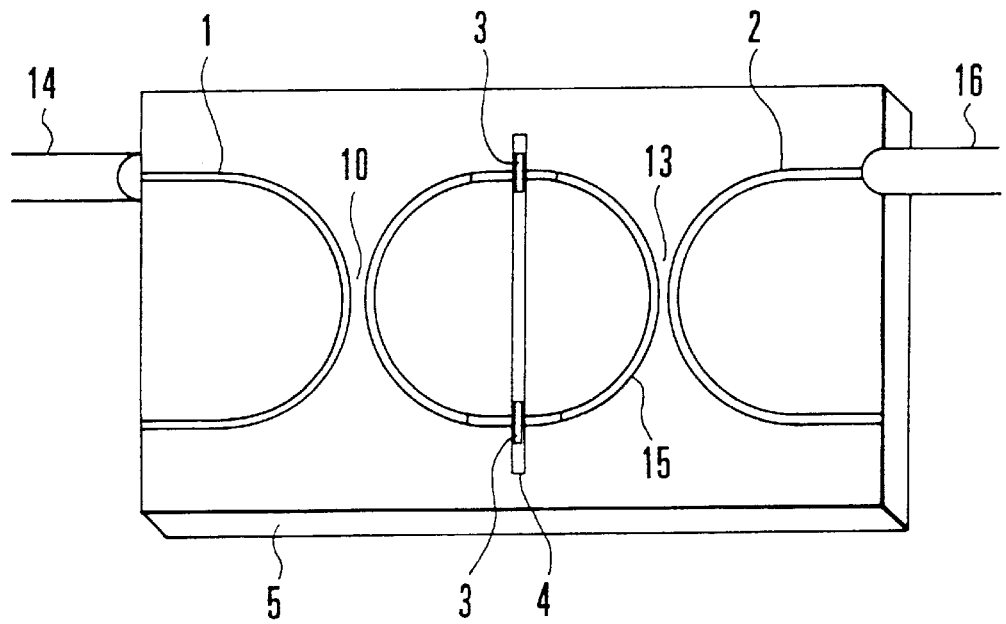
FIG. 14 is a view showing a polarization-independent waveguide ring resonator according to the present invention.
Figure 15:
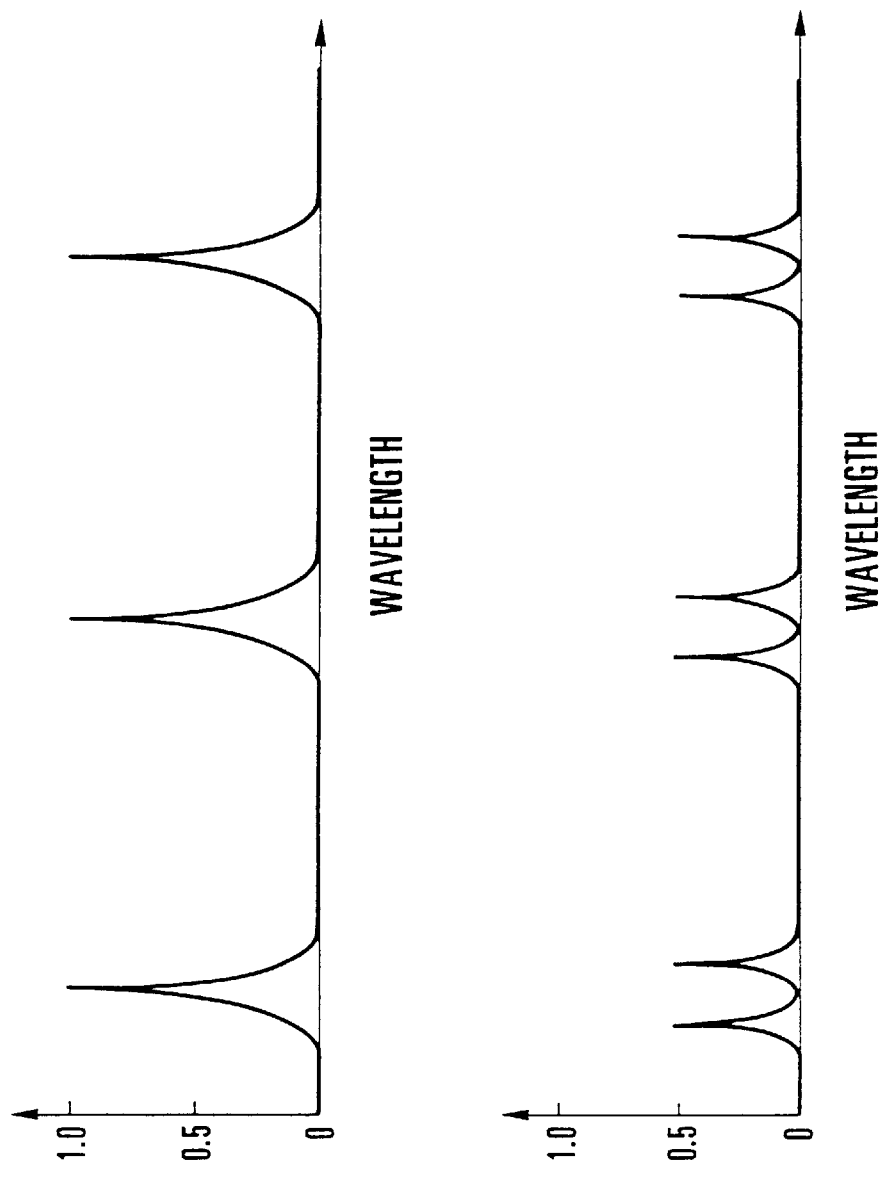
FIGS. 15A and 15B are graphs showing the characteristics of the waveguide ring resonator shown in FIG. 14.

FIG. 14 shows the 11th example of the present invention, in which the polarization convertor of the present invention was applied to a waveguide ring resonator. That is, FIG. 14 is a schematic view showing a polarization-independent waveguide ring resonator according to the present invention. Referring to FIG. 14, reference numerals 1 to 5 denote the same parts as in FIG. 11; 10 and 13, the same parts as in FIG. 12; 14, an input fiber; 15, a ring waveguide; and 16, an output fiber. On a silicon substrate 5, an input waveguide 1, the ring waveguide 15, and an output waveguide 2 are arranged. The input waveguide 1 and the ring waveguide 15 are coupled by a first directional coupler 10, and the output waveguide 2 and the ring waveguide 15 are coupled by a second directional coupler 13. A groove 4 is formed at two positions (intermediate positions viewed from the directional couplers 10 and 13) of the ring waveguide 15. Polyimide half waveplates 3 are inserted into this groove. The dimensions, the manufacturing conditions, and the propagation characteristics of the waveguides, the angle formed between the optical principal axis of the waveplate and the waveguide substrate, the shapes of the groove and the waveplate, the angle formed between the groove and the waveguides, and the characteristics of the waveplate used in this example are the same as those in Example 9. The principle of this example is also the same as in Example 10. In the absence of the optical waveplates 3, there is a difference in optical path length upon one propagation along the ring resonator between horizontal polarization and vertical polarization due to the birefringence of the waveguides. To compensate for this difference, the half waveplates 3 were inserted to function as a polarization convertor, thereby eliminating the polarization dependence. FIG. 15A shows the transmission spectrum of the ring resonator when the polyimide optical waveplates of this example were inserted. For comparison, FIG. 15B shows the transmission spectrum of the ring resonator when there was no optical waveplate. In FIGS. 15A and 15B, the wavelength is plotted on the abscissa, and the intensity of transmitted light (given unit) is plotted on the ordinate. The use of the polarization convertor incorporating the polyimide optical waveplates made it possible to obtain a loss of one tenth or less of that when the polarization convertor using the rock-crystal waveplates was used.

The polyimide optical waveplates were inserted at two positions in this example, but the present invention is not limited to this example. That is, it is obvious that similar effects can be obtained if only an even number of waveplates are inserted. If the number of waveplates is an odd number, such as 1 or 3, the cavity length is doubled while the effect of eliminating the polarization dependence remains the same. This means that miniaturization is possible because the length of the ring waveguide can be halved.

EXAMPLE 12

Figure 16:
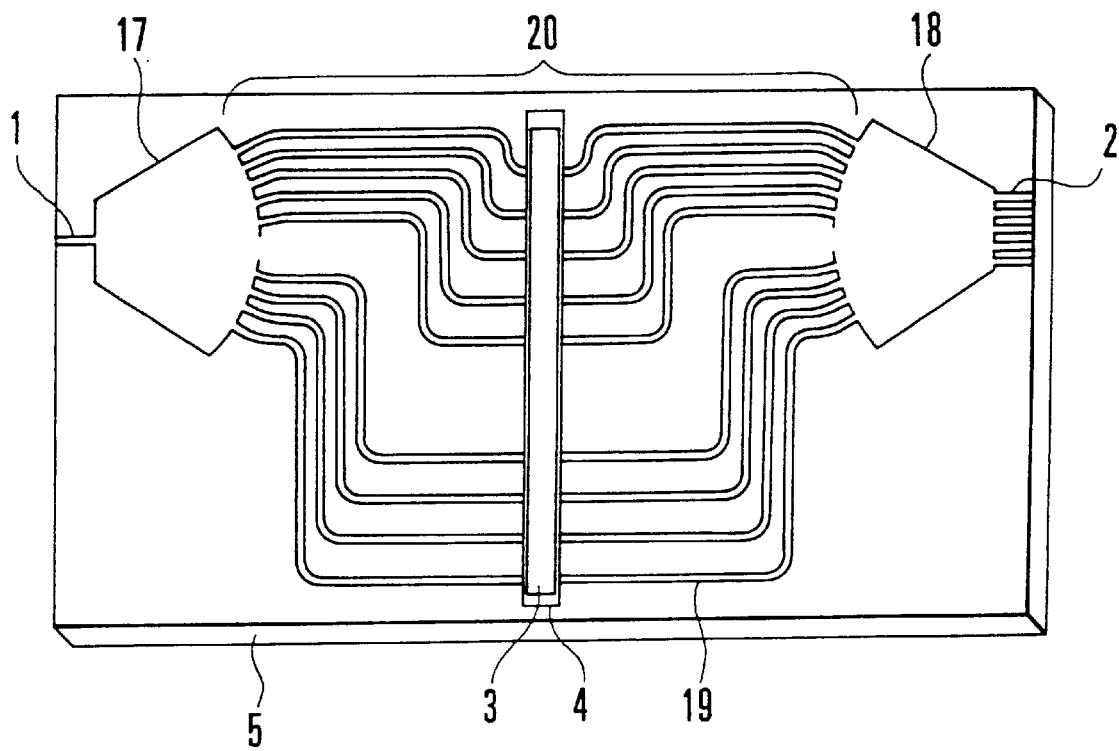
FIG. 16 is a polarization-independent waveguide multi/demultiplexer using an arrayed-waveguide grating according to the present invention.

FIG. 16 shows the 12th example of the present invention, in which the polarization convertor of the present invention was applied to a multi/demultiplexer using an arrayed-waveguide grating. That is, FIG. 16 is a schematic view showing a polarization-independent waveguide multi/demultiplexer using the arrayed-waveguide grating according to the present invention. Referring to FIG. 16, reference numerals 1 to 5 denote the same parts as in FIG. 11; 17, a first slab waveguide; 18, a second slab waveguide; 19, channel waveguides; and 20, an arrayed waveguide.

On a silicon substrate 5, an input waveguide 1, the first slab waveguide 17, the arrayed waveguide 20, the second slab waveguide 18, and a plurality of output waveguides 2 are connected in this order. The two slab waveguides 17 and 18 are connected to a plurality of the channel waveguides 19 formed into sectors having the ends of the input waveguide 1 and the output waveguides, respectively, as the centers of curvature. The arrayed waveguide 20 is constituted by a plurality of channel waveguides whose lengths differ from one another by ΔL. One common groove 4 is formed in a central portion of these channel waveguides 19, and a polyimide half waveplate 3 is inserted into the groove 4. The dimensions, the manufacturing conditions, and the propagation characteristics of the waveguides, the angle formed between the optical principal axis of the waveplate and the waveguide substrate, the shapes of the groove and the waveplate, the angle formed between the groove and the waveguides, and the characteristics of the waveplate used in this example are the same as those in Example 9. The half waveplate 3 must be arranged at the midpoint of each of the channel waveguides 19. In this example, therefore, the arrayed waveguide 20 is designed symmetrically such that the midpoints of the channel waveguides 19 are arranged in line. Consequently, the groove 4 is formed as one continuous straight line. In this case, the polyimide half waveplate 3 reed only be a single waveplate having a length by which the waveplate traverses all the channel waveguides 19 constituting the arrayed waveguide 20. The arrayed waveguide may not be symmetrical depending on the design. In such a case, the same number of half waveplates as the number of the channel waveguides 19 must be inserted, since the groove is not formed in line. This is unfavorable because the amount of work increases.

Figure 17:
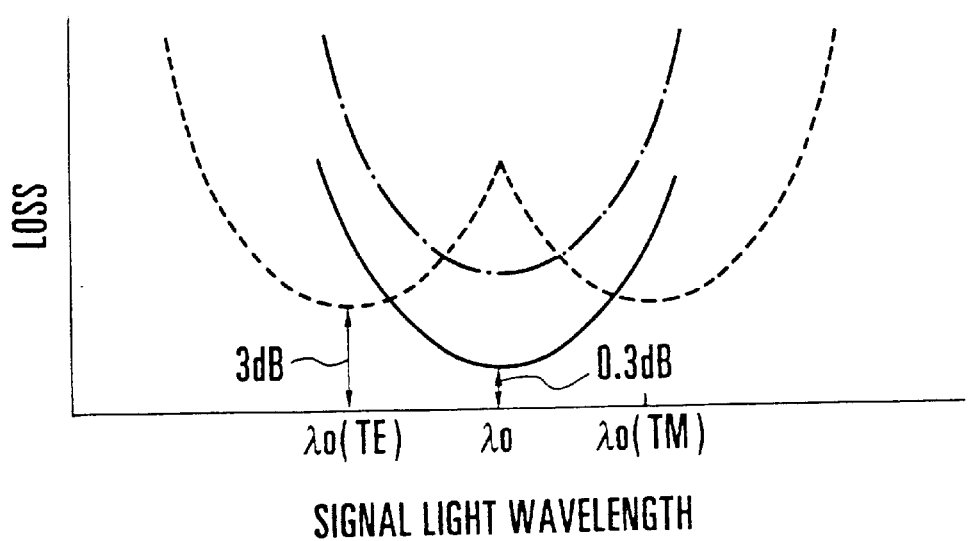
FIG. 17 is a graph showing the demultiplexing characteristics of the waveguide multi/demultiplexer shown in FIG. 16.

The effect of eliminating the polarization dependence when the polarization convertor of the present invention is applied to the arrayed-waveguide grating is identical with that of the Mach-Zender interferometer in Example 10. FIG. 17 is a graph showing the demultiplexing characteristics of the waveguide multi/demultiplexer illustrated in FIG. 16. In FIG. 17, the signal light wavelength is plotted on the abscissa, and the loss is plotted on the ordinate. The curves in FIG. 17 represent the multi/demultiplexing characteristic when the polarization convertor using the polyimide optical waveplate is present (a solid line), that when a polarization convertor using a conventional rock-crystal optical waveplate is present (an alternate long and short dashed line), and that when there is no polarization convertor (a dotted line). When the polarization convertor incorporating the polyimide optical waveplate is used, the polarization dependence is eliminated, and the loss largely decreases to 0.3 dB.

EXAMPLE 13

Figure 18:
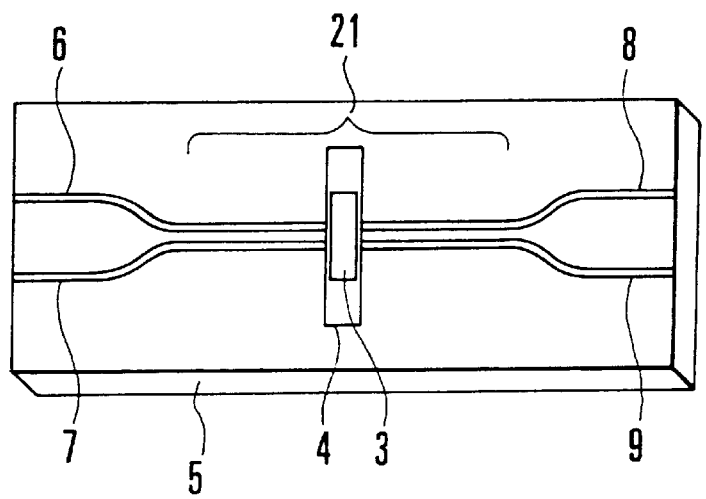
FIG. 18 is a view showing a polarization-independent waveguide directional coupler according to the present invention.

FIG. 18 shows the 13th example of the present invention, in which the polarization convertor of the present invention was applied to a directional coupler. That is, FIG. 18 is a schematic view showing a polarization-independent waveguide directional coupler according to the present invention. Referring to FIG. 18, reference numerals 3 to 9 denote the same parts as in FIG. 12; and 21, a directional coupler.

On a silicon substrate 5, a first input waveguide 6, a second input waveguide 7, the directional coupler 21, a first output waveguide 8, and a second output waveguide 9 are formed. A groove 4 is formed in the middle of the directional coupler 21, and a polyimide half waveplate 3 is inserted into the groove 4. The dimensions, the manufacturing conditions, and the propagation characteristics of the waveguides, the angle formed between the optical principal axis of the waveplate and the waveguide substrate, the shapes of the groove and the waveplate, the angle formed between the groove and the waveguides, and the characteristics of the waveplate used in this example are the same as those in Example 9. The length L of the directional coupler 21 is one-half of the unity coupling length. This device is so designed as to operate as a 3 dB coupler (coupling ratio 1:1). However, the present invention is not limited to this example but applicable to directional couplers having various coupling ratios.

Assume the effective refractive indices of two propagation modes (an even mode and an odd mode) of the direction coupler are $n_e$ and $n_o$, respectively, and horizontal and vertical polarizations are given subscripts (TE) and (TM), respectively. The even and odd modes are excited at the left end of the directional coupler by light propagating through the first input waveguide. Since the horizontal and vertical polarizations are switched during the propagation, the differences in optical path length between the even and odd modes are given as follows: For input of horizontal polarization, $$(n_{e(TE)}L/2 + n_{e(TM)}L/2) - (n_{o(TE)}L/2 + n_{o(TM)}L/2) \quad (1)$$

For input of vertical polarization, $$(n_{e(TM)}L/2 + n_{e(TE)}L/2) - (n_{o(TM)}L/2 + n_{o(TE)}L/2) \quad (2)$$

That is, the two values are in agreement. Therefore, the coupling ratio of the direction coupler has no polarization dependence. The length L of the directional coupler 21 is so set that the value of Equation (1) and (2) is a quarter of the wavelength. Therefore, light components equally distributed (1:1) are extracted from the first and second output waveguides 8 and 9. The present invention is of course not limited to the directional coupler having the coupling ratio of 1:1 but is applicable to those having various coupling ratios. When the polarization convertor incorporating the polyimide optical waveplate 3 was used as the directional coupler 21 of this example, no polarization dependence of the coupling ratio was found, and the excess loss was 0.3 dB.

EXAMPLE 14

Figure 19:
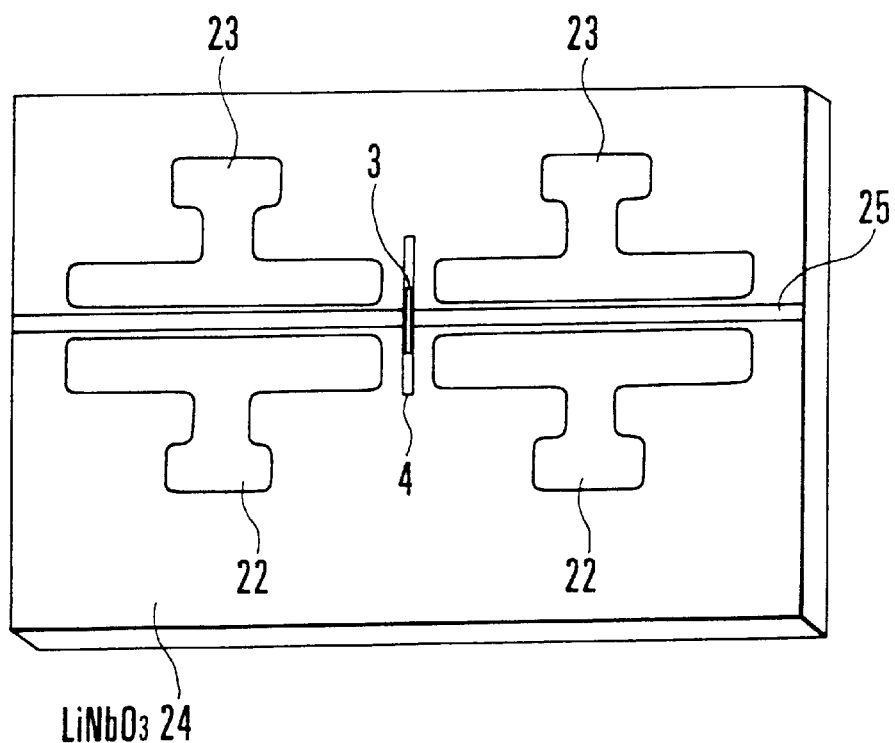
FIG. 19 is a view showing a polarization-independent waveguide phase modulator according to the present invention.

FIG. 19 shows the 14th example of the present invention, in which the polarization convertor of the present invention was applied to a phase modulator. That is, FIG. 19 is a schematic view showing a polarization-independent waveguide phase modulator according to the present invention. Referring to FIG. 19, reference numerals 3 and 4 denote the same parts as in FIG. 11; 22, positive electrodes; 23, negative electrodes; 24, an LiNbO$_3$ substrate; and 25, a Ti in-diffused substrate.

A titanium (Ti) film was deposited on the mirror-polished lithium niobate (LiNbO$_3$) substrate 24 and patterned. Thereafter, Ti was thermally diffused in a high-temperature atmosphere at about 1,000° C. to form the optical waveguide 25. In addition, the gold (Au) electrodes 22 and 23 were formed near the waveguide 25, thereby manufacturing a phase modulator. When a voltage is applied across the positive and negative electrodes in FIG. 19, the refractive index of the waveguide 25 changes due to the electrooptic effect. However, since the change in the refractive index brought about by the electrooptic effect has a polarization dependence, the change in phase of light also has a difference between horizontal polarization and vertical polarization. Therefore, a groove 4 was formed at the center of the phase modulator in a direction perpendicular to the waveguide 25, and a polyimide half waveplate 3 was inserted into this groove. In this case, by inserting the polyimide half waveplate 3 as a polarization convertor such that its optical principal axis formed an angle of 45° with the waveguide substrate 25, a polarization-independent phase modulator was realized. The dimensions, the manufacturing conditions, and the propagation characteristics of the waveguides, the angle formed between the optical principal axis of the waveplate and the waveguide substrate, the shapes of the groove and the waveplate, the angle formed between the groove and the waveguides, and the characteristics of the waveplate used in this example are the same as those in Example 9. The excess loss was found to be 2.0 dB when the polarization convertor incorporating the polyimide optical waveplate 3 was used. The LiNbO$_3$ substrate has a larger brittleness than that of silica, so it is difficult to accurately form grooves in this substrate. Therefore, it is estimated that this large excess loss was caused by an unsatisfactory processing accuracy of the groove.

EXAMPLE 15

Figure 20:
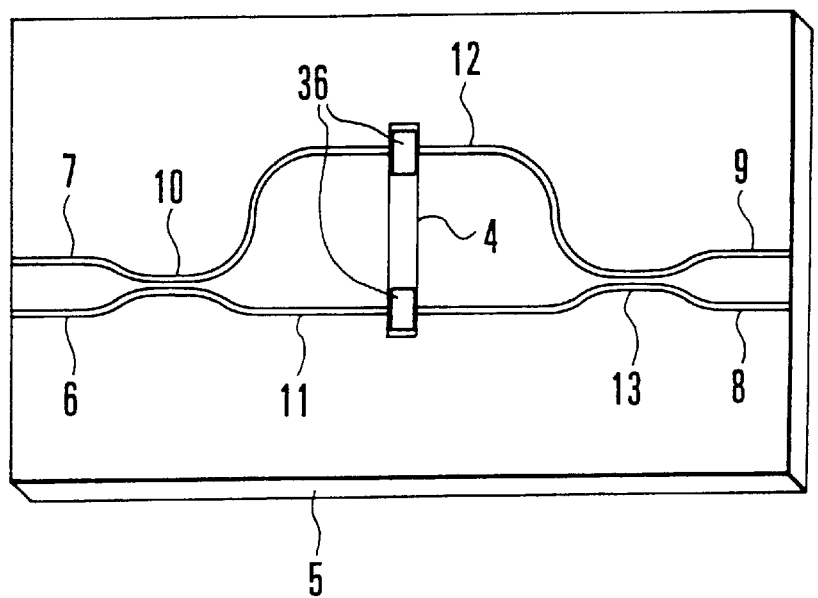
FIG. 20 is a view showing a polarization-independent waveguide polarization beam splitter according to the present invention.

FIG. 20 shows the 15th example of the present invention, in which the polarization convertor of the present invention was applied to a polarization beam splitter. That is, FIG. 20 is a schematic view showing a polarization-independent waveguide polarization beam splitter according to the present invention. Referring to FIG. 20, reference numerals 4 to 13 denote the same parts as in FIG. 12; and 36, polyimide quarter waveplates.

This waveguide device is identical with that discussed in Example 10 except that the optical path length difference between first and second optical paths 11 and 12 is a quarter wavelength ($\lambda/4$), the polyimide optical waveplates 36 inserted into the optical paths are quarter waveplates rather than half waveplates, and the angle formed between the optical principal axis of each of the optical waveplates 36 and a substrate is not 45°. The optical principal axis of the optical waveplate 36 inserted into the first optical path 11 is perpendicular to a waveguide substrate 5. Therefore, although there is no coupling between polarization modes, vertical polarization has an optical path length longer by a quarter wavelength than that for horizontal polarization in the first optical path 11. On the other hand, the optical principal axis of the quarter waveplate 36 inserted into the second optical path 12 is parallel to the waveguide substrate 5. Therefore, horizontal polarization has an optical path length longer by a quarter wavelength than that for vertical polarization in the second optical path 12. In addition, the second optical path 12 is formed to be longer by a quarter wavelength than the first optical path 11 by the original circuit design. Consequently, the optical path lengths of the individual modes are as follows:

| | |
|---|---|
| Vertical polarization in 1st optical path | $\alpha + \lambda/4$ |
| Horizontal polarization in 1st optical path | $\alpha$ |
| Vertical polarization | $\alpha + \lambda/4$ |

-continued

| | |
|---|---|
| in 2nd optical path | |
| Horizontal polarization | $\alpha + \lambda/4 + \lambda/4$ |
| in 2nd optical path | |

That is, there is no optical path length difference between the two arm waveguides with respect to vertical polarization. Therefore, input light from a first input waveguide 6 is output from a second output waveguide 9 as a cross port.

Since, on the other hand, an optical path length difference of a half wavelength is present between the arm waveguides with respect to horizontal polarization, input light from the first input waveguide 6 is output from a first output waveguide 8 as a through port.

More specifically, this circuit functions as a polarization beam splitter.

The dimensions, the manufacturing conditions, and the propagation characteristics of the waveguides, the angle formed between the optical principal axis of the waveplate and the waveguide substrate, the shapes of the groove and the waveplate, the angle formed between the groove and the waveguides, and the characteristics of the waveplate used in this example are the same as those in Example 9. The polyimide quarter waveplates 36 used were those manufactured in Example 2. When vertical polarization was input from the first input waveguide 6, the light was output from the second output waveguide 9 as a cross port. When horizontal polarization was input from the first input waveguide 6, the light was output from the first output waveguide 8 as a through port. The excess loss was found to be 0.3 dB when the polarization convertor incorporating the polyimide optical waveplates 36 was used.

Figure 21:
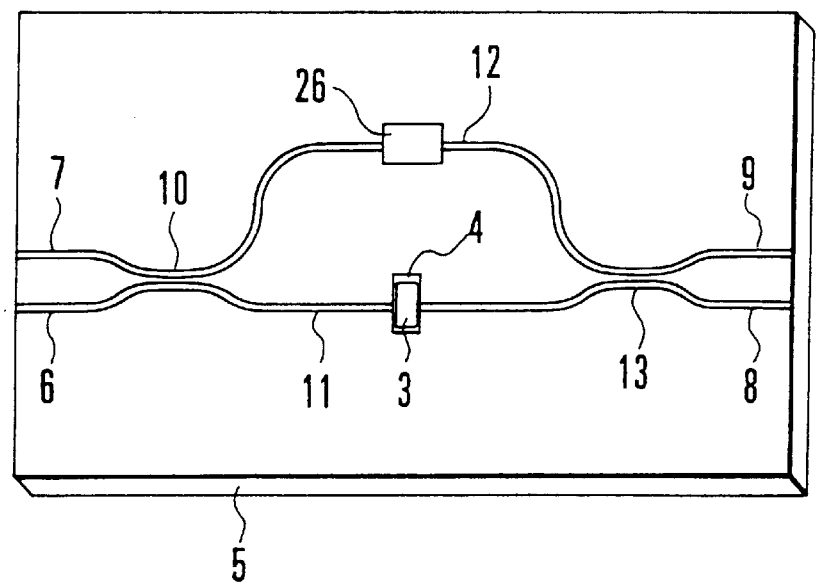
FIG. 21 is a view showing a waveguide polarization beam splitter using a polarization-independent thermo-optic phase shifter according to the present invention.

In this example, the method using two quarter waveplates has been explained. However, as illustrated in FIG. 21, it is also possible to realize a polarization beam splitter by inserting a half waveplate 3 into a groove 4, which is formed in a first optical path 11, such that the optical principal axis of the waveplate is parallel or perpendicular to a waveguide substrate 5, and by arranging a phase controller, such as a thermo-optic phase shifter 26, in a second optical path 12. The thermo-optic phase shifter 26 shown in FIG. 21 is manufactured by forming a thin-film heater on the surface of a waveguide. The thermo-optic phase shifter 26 controls the waveguide temperature by heating this thin-film heater, thereby controlling the phase of light by using the thermo-optic effect.

EXAMPLE 16

Figure 22:
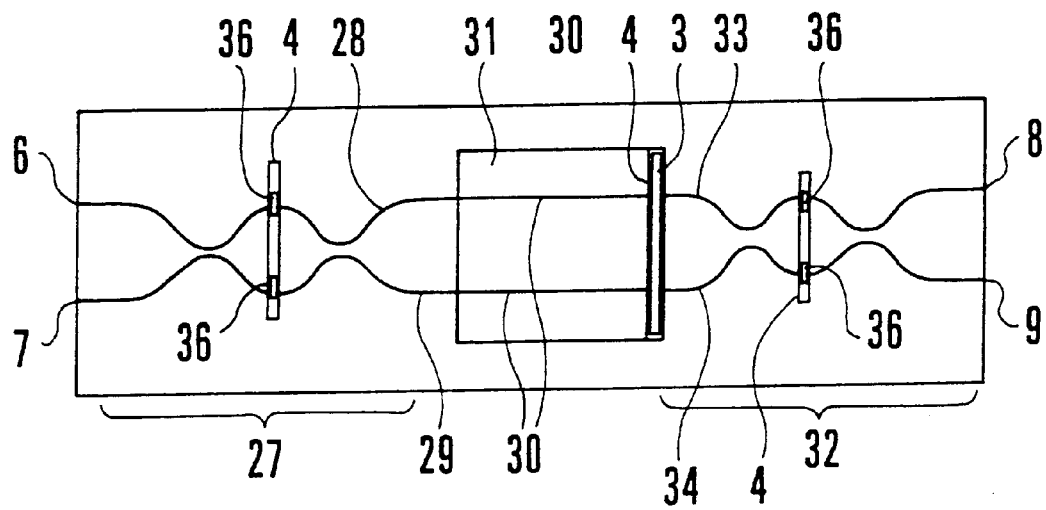
FIG. 22 is a view showing a polarization-independent optical circulator using polarization beam splitters and magnetic waveguides according to the present invention.

FIG. 22 shows the 16th example of the present invention. That is, FIG. 22 is a schematic view showing a polarization-independent optical circulator using polarization beam splitters and magnetic waveguides according to the present invention. Referring to FIG. 22, reference numerals 3, 4, and 6 to 9 denote the same parts as in FIG. 12; 27, a first polarization beam splitter consisting of nonmagnetic waveguides; 28, a first output waveguide of the first polarization beam splitter; 29, a second output waveguide of the first polarization beam splitter; 30, magnetic waveguides; 31, a nonreciprocal device consisting of the magnetic waveguides; 32, a second polarization beam splitter consisting of nonmagnetic waveguides; 33, a first input waveguide of the second polarization beam splitter; and 34, a second input waveguide of the second polarization beam splitter. This waveguide device is constituted by the polarization beam splitters discussed in Example 15, the magnetic waveguides, and the polyimide optical waveplate of the present invention.

The operating principle of the device when light is input from the first input waveguide 6 will be described first. The input light from the first input waveguide 6 is split by the first polarization beam splitter. Consequently, the vertical polarization of the input light is transmitted to the second output waveguide 29 of the first polarization beam splitter as a cross port, and the horizontal polarization of the input light is transmitted to the first output waveguide 28 of the first polarization beam splitter as a through port. The device is so designed that these light components are subjected to Faraday rotation in the magnetic waveguides 30 to rotate their polarization planes 45°. In addition, the polarization planes of the transmitted light components are further rotated 45° since the polyimide half waveplate is arranged such that its optical principal axis is inclined 22.5° or 67.5° from a waveguide substrate 5. As a result, the output horizontal polarization from the first output waveguide 28 of the first polarization beam splitter is converted into vertical polarization and input to the first input waveguide 33 of the second polarization beam splitter. On the other hand, the output vertical polarization from the second output waveguide 28 of the first polarization beam splitter is converted into horizontal polarization and input to the second input waveguide 34 of the second polarization beam splitter. Thereafter, since the vertical and horizontal polarizations are transmitted to the cross and through ports, respectively, by the second polarization beam splitter, the two polarizations are multiplexed and output from the second output waveguide 9. Consequently, the input light from the first input waveguide 6 is output from the second output waveguide 9, and the input light from the second input waveguide 7 is output from the first output waveguide 8, independent of their respective polarized states.

Consider next the case in which the input ports are switched, i.e., light is input from the second output waveguide 9. In this case, the vertical polarization is transmitted to the first input waveguide 33 of the second polarization beam splitter as the cross port by the second polarization beam splitter. The horizontal polarization, on the other hand, is transmitted to the second input waveguide 34 of the second polarization beam splitter as the through port. Thereafter, the polarization planes of these light components are rotated 45° by the polyimide half waveplate 3.

The operation to this point is a reversible operation because of the principle of a reciprocal device. Since, however, the magnetic waveguide 31 is a nonreciprocal device, the rotating direction of the polarization plane when light is transmitted from the right to the left in FIG. 22 is opposite to that when light is transmitted from the left to the right. For this reason, the input vertical polarization from the first input waveguide 33 of the second polarization beam splitter is transmitted intact to the first output waveguide 28 of the first polarization beam splitter, and the input horizontal polarization from the second input waveguide 34 of the second polarization beam splitter is transmitted intact to the second output waveguide 29 of the first polarization beam splitter. These light components are multiplexed by the first polarization beam splitter and output from the second input waveguide 7. Likewise, input light from the first output waveguide 8 is output from the first input waveguide 6, independent of the polarized state of that light. That is, this waveguide device functions as a polarization-independent circulator. Note that this device can also function as a polarization-independent waveguide isolator by inputting light from the first input waveguide 6 and extracting it from the second output waveguide 9.

The dimensions, the manufacturing conditions, and the propagation characteristics of the waveguides, the shapes of the grooves and the waveplate, and the characteristics of the waveplate are the same as those in Example 9. In accordance with the design of the waveguide circuit, input light from the first input waveguide 6 was output from the second output waveguide 9, and input light from the second input waveguide 7 was output from the first output waveguide 8, independent of their respective polarized states. Similarly, input light from the first output waveguide 8 was output from the first input waveguide 6, and input light from the second output waveguide 9 was output from the second input waveguide 7, independent of their respective polarized states. The total excess loss was found to be 0.9 dB when the polarization convertor incorporating the polyimide optical plates 36 and 33 was used.

EXAMPLE 17

Figure 23:
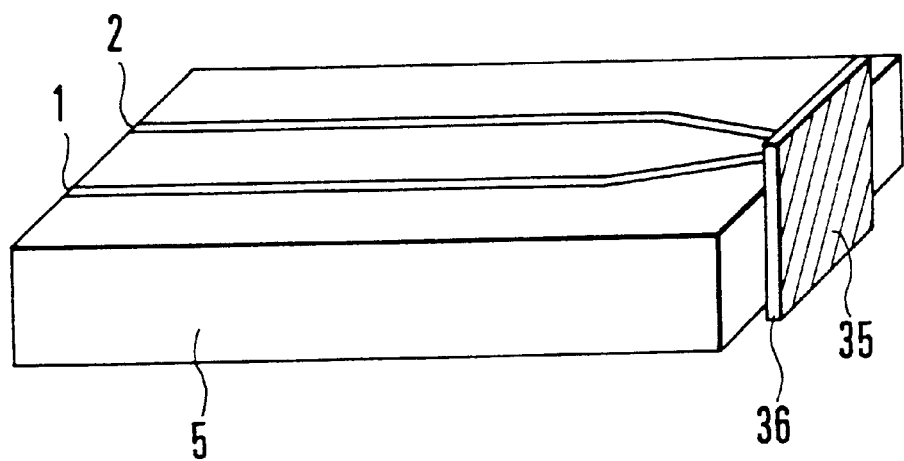
FIG. 23 is a perspective view showing a polarization convertor using a polyimide quarter waveplate and a reflecting layer according to the present invention.

FIG. 23 is a view for explaining the 17th example of the present invention. That is, FIG. 23 is a schematic view showing a polarization convertor using the polyimide quarter waveplate according to the present invention and a reflecting layer. Referring to FIG. 23, reference numerals 1, 2, and 5 denote the same parts as in FIG. 11; 35, a dielectric multilayered interference filter; and 36, a polyimide quarter waveplate.

The principle of this waveguide device is identical with that of the polarization convertor of Example 9 except that polarization conversion is performed by using the polyimide quarter waveplate 36 and the reflecting film 35. The polyimide quarter waveplate 36 arranged at the end face of a waveguide is bonded such that the optical principal axis forms an angle of 45° with a waveguide substrate 5. The reflecting coat 35 for reflecting guided light is formed on the surface of the optical waveplate 36 away from the surface in contact with the waveguide. In this example, the reflecting coat is formed by using the dielectric multilayered interference film. However, it is also possible to use a metal reflecting film as the reflecting coat. The dimensions, the manufacturing conditions, and the propagation characteristics of the waveguide used in this example are the same as those in Example 9. Input light from an input waveguide 1 is transmitted through the polyimide quarter waveplate 36 and reflected by the dielectric multilayered interference film 35. The reflected light is again transmitted through the quarter waveplate 36 and input to an output waveguide 2. Consequently, since the light is transmitted through the quarter waveplate 36 twice, the same effect as when light is transmitted through a half waveplate can be obtained.

A polarization-maintaining single-mode optical fiber was connected to the input waveguide 1 of this polarization convertor, and polarized light (horizontal polarization) having an electric field parallel to the waveguide substrate 5 was input. Consequently, polarized light (vertical polarization) having an electric field perpendicular to the waveguide substrate 5 emerged from the output waveguide 2. Likewise, horizontal polarization emerged from the output waveguide 2 when vertical polarization was input. A polarization mode conversion ratio indicative of the efficiency at which horizontal polarization was converted into vertical polarization or vice versa was measured and found to be 30 dB.

The advantage of this example is that no groove for receiving the optical waveplate need be formed in a waveguide circuit. As discussed in Example 14, a substrate consisting of, e.g., $LiNbO_3$ has a large brittleness, so it is difficult to accurately form grooves in this substrate. It is therefore considered to be effective to apply the method of this example to a waveguide device formed on a substrate of this type.

In this example, the input and output waveguides were separately formed. However, it is also possible to use a single waveguide as the input and output waveguides.

Comparative Example 1

A groove 100 μm wide and 100 μm deep was cut in a silica-based buried optical waveguide at a right angle with respect to the direction of the waveguide. A half waveplate (thickness 91 μm) consisting of a rock crystal and having a wavelength of 1.55 μm was cut such that its optical principal axis formed an angle of 45° with a waveguide substrate. The resultant waveplate was inserted into the groove, and the excess loss was measured. Consequently, the excess loss was found to be 4 dB.

Comparative Example 2

The poly(amic acid) solution prepared in Example 1 was coated on a silicon wafer 4 inches in diameter by a spin coating method and thermally imidized at a maximum temperature of 350° C. The resultant film was peeled from the substrate and cut into a stripe. The obtained film stripe was uniaxially drawn at room temperature by using a tensile tester (Instron). Consequently, the film was broken when elongated by about 1%. The resultant film was found to have a film thickness of 10.1 μm and a Δn of 0.0008. A film thickness of about 1 mm is required to use this polyimide film as a half waveplate with a wavelength of 1.55 μm, and the expected insertion loss is assumed to be 40 dB or larger. It was consequently found that this polyimide film could not be used as an optical waveplate.

According to the present invention, a polyimide film with a film thickness of 20 μm or smaller is used. Therefore, in place of optical waveplates using conventional inorganic single-crystal materials, it is possible to provide an optical waveplate which is easy to manufacture and has a high flexibility. This optical waveplate causes little insertion loss, since the film thickness is smaller than that of an optical waveplate using a rock crystal, and also has a high heat resistance of 300° C. or higher. This makes it possible primarily to improve the performance of waveguide devices, reduce the manufacturing cost, and increase the efficiency in manufacturing processes. In addition, by inserting the optical waveplate into various lightwave circuits as discussed in the examples, it is also possible to improve the function and the performance of the devices, and to manufacture novel waveguide devices.

What is claimed is:

1. A waveguide device constituted by an optical waveguide formed on a substrate, wherein a groove is so formed as to form a predetermined angle, which is close to a right angle, with said waveguide and to cross said waveguide, and an optical waveplate consisting of a polyimide film with a film thickness of not more than 20 μm is inserted into said groove.

2. A polarization convertor, wherein a waveguide device comprises a single optical waveguide, and a half waveplate consisting of a polyimide film with a film thickness of not more than 20 μm and having a product of an in-plane anisotropy of refractive index and a thickness set to one-half of a wavelength of light propagating through said waveguide is inserted into a groove formed in a waveguide substrate so as to cross said waveguide substrate and to make a certain angle with said waveguide.

3. A convertor according to claim 2, wherein the certain angle is defined between 80° and 90°.

4. A waveguide device, wherein said waveguide device is a Mach-Zender interferometer arranged on a waveguide substrate and comprising two input waveguides, a first directional coupler connected to said input waveguides, two output waveguides, a second directional coupler connected to said output waveguides, and first and second waveguides connecting said first and second directional couplers, and a polarization convertor consisting of a polyimide film with a film thickness of not more than 20 $\mu$m is arranged in the middle of an optical path of each of said first and second waveguides so as to form a certain angle with said waveguide substrate.

5. A device according to claim 4, wherein the certain angle is defined between 80° and 90°.

6. A waveguide device, wherein said waveguide device is a ring resonator arranged on a waveguide substrate and comprising a plurality of input/output waveguides, and a ring waveguide coupled to said input/output waveguides, and at least one polarization convertor consisting of a polyimide film with a film thickness of not more than 20 $\mu$m is arranged on said ring waveguide so as to form a certain angle with said waveguide substrate, in order that an equal optical path length of said ring waveguide is obtained for input horizontal polarization and vertical polarization.

7. A device according to claim 6, wherein the certain angle is defined between 80° and 90°.

8. A waveguide device, wherein said waveguide device is a directional coupler formed on a waveguide substrate, and a polarization convertor consisting of a polyimide film with a film thickness of not more than 20 $\mu$m is arranged in the middle of said directional coupler so as to form a certain angle with said waveguide substrate.

9. A device according to claim 8, wherein the certain angle is defined between 80° and 90°.

10. A waveguide device, wherein said waveguide device is a phase modulator comprising a waveguide having an electrooptic effect, and a pair of electrodes arranged near said waveguide, and at least one polarization convertor consisting of a polyimide film with a film thickness of not more than 20 $\mu$m is arranged in the middle of said waveguide so as to form a certain angle with a waveguide substrate.

11. A device according to claim 10, wherein the certain angle is defined between 80° and 90°.

12. A waveguide device, wherein said waveguide device is a polarization beam splitter arranged on a waveguide substrate and comprising two input waveguides, a first directional coupler connected to said input waveguides, two output waveguides, a second directional coupler connected to said output waveguides, and first and second waveguides connecting said first and second directional couplers, said first and second waveguides have an optical path length difference which is a quarter of a wavelength of guided light, and waveplates each consisting of a polyimide film with a film thickness of not more than 20 $\mu$m are arranged in optical paths of said first and second waveguides so as to form certain angles with said waveguides.

13. A device according to claim 12, wherein each of said waveplates is a quarter waveplate having a product of an in-plane anisotropy of refractive index and a thickness set to a quarter of a wavelength of light propagating through said waveguides, said quarter waveplates being inserted into said waveguide substrate such that optical principal axes of said quarter waveplates are, respectively, perpendicular and parallel to said waveguide substrate.

14. A waveguide device, wherein said waveguide device is a polarization beam splitter arranged on a waveguide substrate and comprising two input waveguides, a first directional coupler connected to said input waveguides, two output waveguides, a second directional coupler connected to said output waveguides, and first and second waveguides connecting said first and second directional couplers, said first and second waveguides have an optical path length difference which is a quarter of a wavelength of guided light, and a waveplate consisting of a polyimide film with a film thickness of not more than 20 $\mu$m is arranged in an optical path of said first waveguide so as to form a certain angle with said first waveguide.

15. A device according to claim 14, wherein said waveplate is a half waveplate, said half waveplate being inserted into said waveguide substrate such that an optical principal axis of said half waveplate is perpendicular to said waveguide substrate, and a thermo-optic phase shifter is arranged in an optical path of said second waveguide.

16. A device according to claim 14, wherein said waveplate is a half waveplate, said half waveplate being inserted into said waveguide substrate such that an optical principal axis of said half waveplate is parallel to said waveguide substrate, and a thermo-optic phase shifter is arranged in an optical path of said second waveguide.

17. A waveguide device comprising a first 2×2 polarization beam splitter constituted by nonmagnetic waveguides, two nonreciprocal elements constituted by magnetic waveguides, and a second 2×2 polarization beam splitter, wherein a waveplate consisting of a polyimide film with a film thickness of not more than 20 $\mu$m is arranged between said two nonreciprocal elements and said second 2×2 polarization beam splitter so as to form a certain angle with a waveguide substrate.

18. A device according to claim 14, wherein said waveplate is a half waveplate, said half waveplate being inserted into said waveguide substrate such that an optical principal axis of said half waveplate forms an angle of 22.5° with said waveguide substrate.

19. A device according to claim 14, wherein said waveplate is a half waveplate, said half waveplate being inserted into said waveguide substrate such that an optical principal axis of said half waveplate forms an angle of 67.5° with said waveguide substrate.

20. A waveguide device comprising an optical waveguide formed on a substrate, an optical waveplate consisting of a polyimide film with a film thickness of not more than 20 $\mu$m and formed in tight contact with an end face of said optical waveguide so as to be perpendicular to a longitudinal direction of said optical waveguide, and a reflecting coat, formed on a surface of said optical waveplate away from the end face of said waveguide, for reflecting guided light.

21. A waveguide device comprising an optical waveguide formed on a substrate, an optical waveplate consisting of a polyimide film with a film thickness of not more than 20 $\mu$m and formed in tight contact with an end face of said optical waveguide so as to be inclined from a longitudinal direction of said optical waveguide, and a reflecting coat, formed on a surface of said optical waveplate away from the end face of said waveguide, for reflecting guided light.

22. A waveguide device comprising a polarization convertor including at least one optical waveguide formed on a waveguide substrate, and an optical waveplate consisting of a polyimide film with a film thickness of not more than 20 $\mu$m, wherein said optical waveplate is arranged in tight contact with an end face of said waveguide such that an optical principal axis of said optical waveplate forms a certain angle with said waveguide substrate.

23. A device according to claim 22, wherein said optical waveplate is a quarter waveplate having a product of an in-plane anisotropy of refractive index and a thickness set to a quarter of a wavelength of light propagating through said optical waveguide, and an optical principal axis of said quarter waveplate forms an angle of 45° with said waveguide substrate.

24. A waveguide device unit comprising a plurality of waveguide devices formed on a single substrate and each having an optical waveplate consisting of a polyimide film with a film thickness of not more than 20 µm, wherein said waveguide devices are coupled together through optical waveguides.

25. A polarization converter, wherein a waveguide device comprises a single optical waveguide, and a quarter waveplate consisting of a polyimide film with a film thickness of not more than 20 µm and having a refractive index and a thickness set to a quarter of a wavelength of light propagating through said waveguide is inserted into a groove formed in a waveguide substrate so as to cross said waveguide substrate at a predetermined angle with said waveguide.

26. A converter according to claim 25, wherein said predetermined angle is an angle between 80° and 90°.

* * * * *